March 3, 1964  S. H. McMILLAN ETAL  3,123,217
CAPSULE INSPECTION METHOD AND SORTING MACHINE
Filed Jan. 19, 1961  10 Sheets-Sheet 1

INVENTORS
STEWART H. McMILLAN, RALPH E. MOTTIN,
WILFRED A. SUTTON, ROBERT D. MacDONALD
& EDWARD LINCK
BY Barnes, Kisselle, Raisch & Choate
ATTORNEYS March 3, 1964 S. H. McMILLAN ETAL 3,123,217
CAPSULE INSPECTION METHOD AND SORTING MACHINE
Filed Jan. 19, 1961 10 Sheets-Sheet 2

INVENTORS
STEWART H. McMILLAN, RALPH E. MOTTIN,
WILFRED A. SUTTON, ROBERT D. MacDONALD,
& EDWARD LINCK
BY Barnes, Kisselle, Raisch & Choate
ATTORNEYS

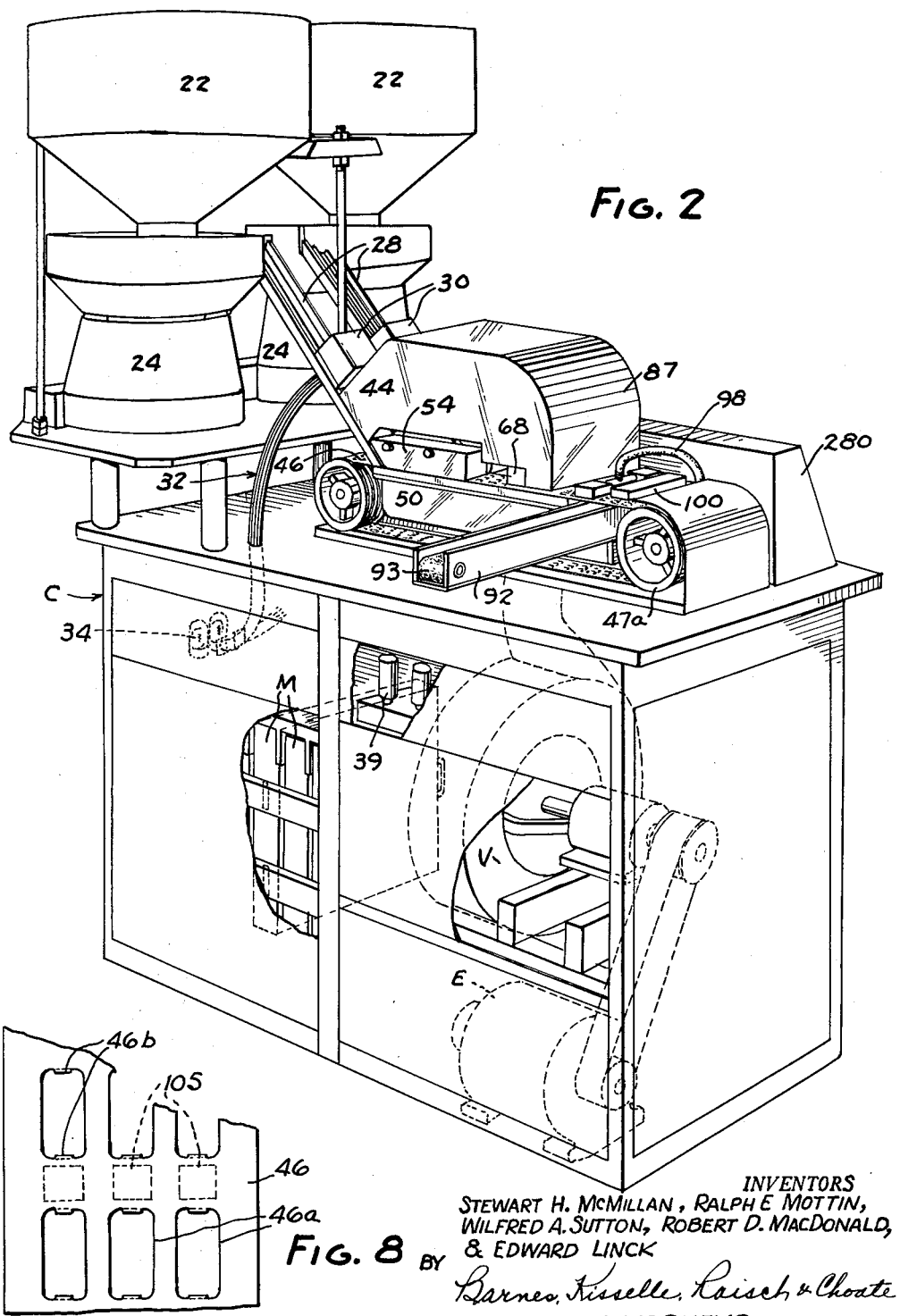

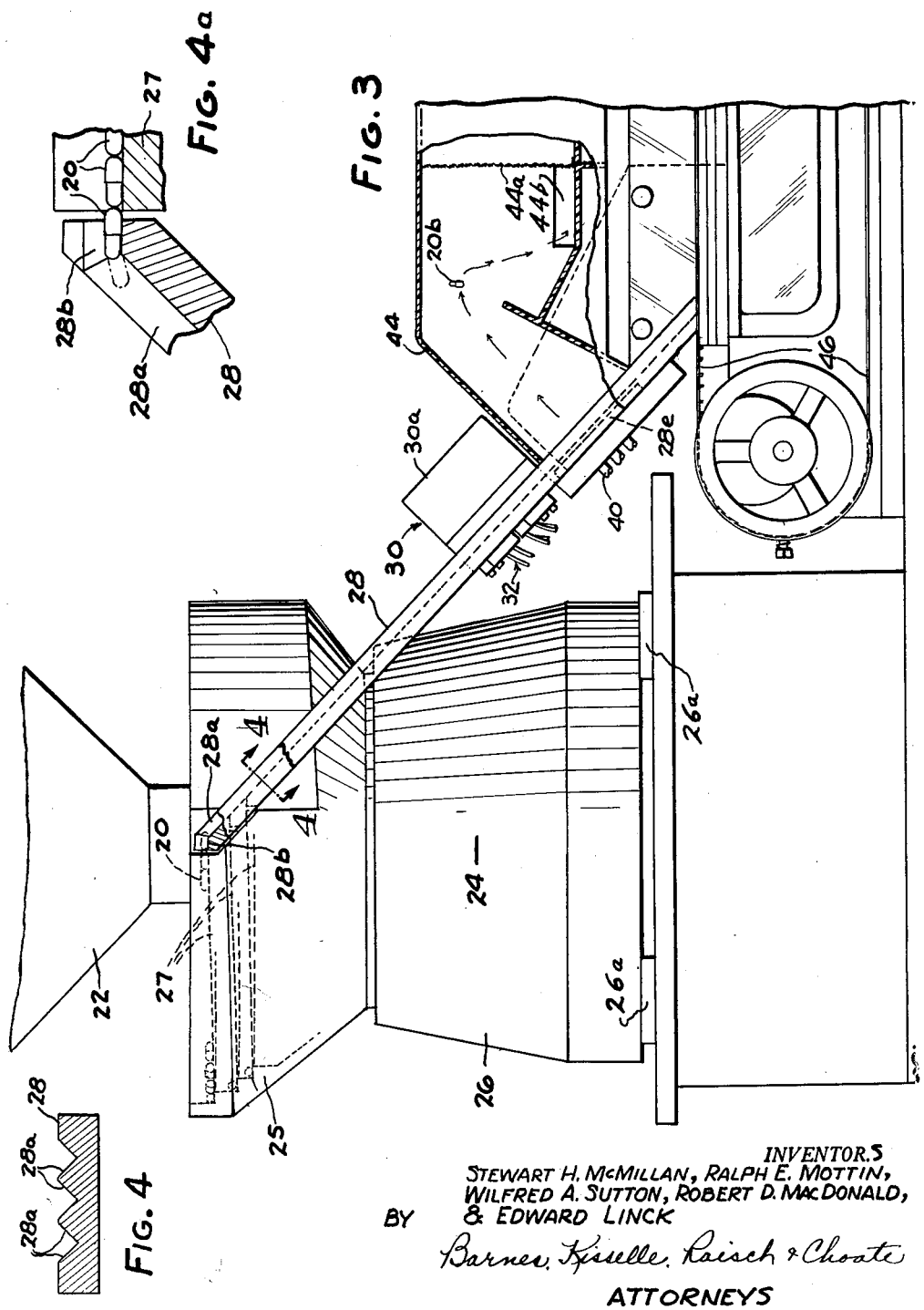

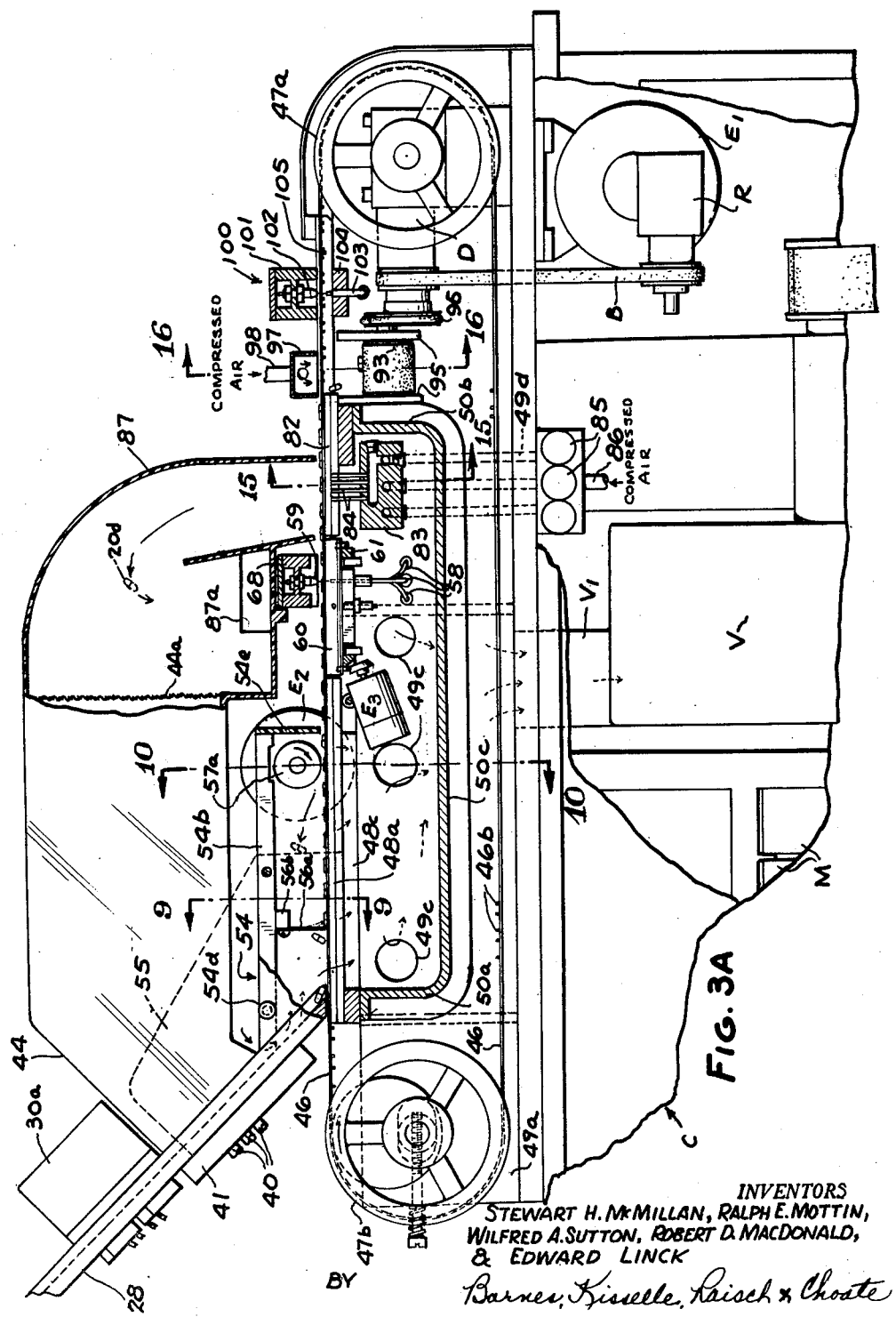

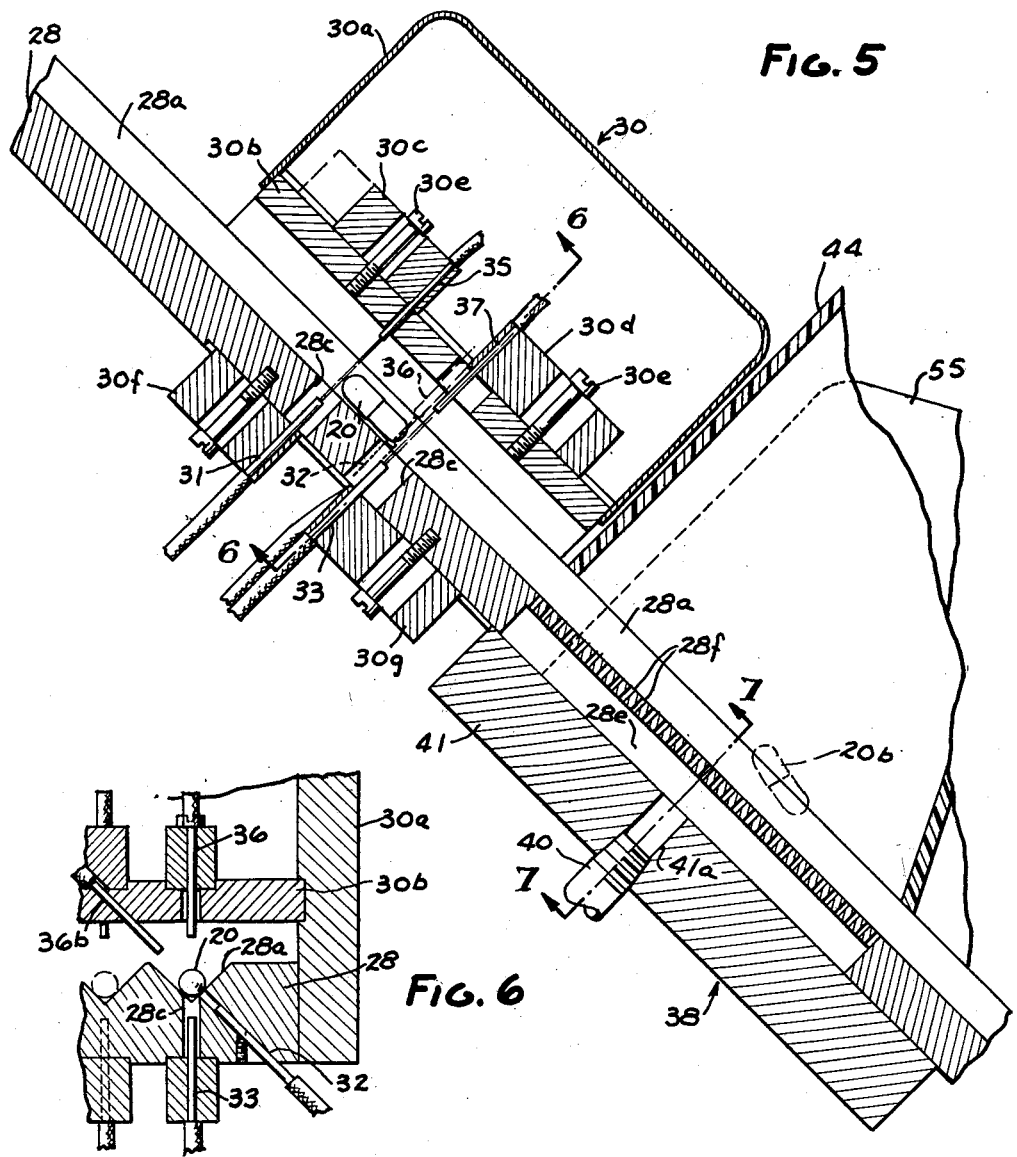

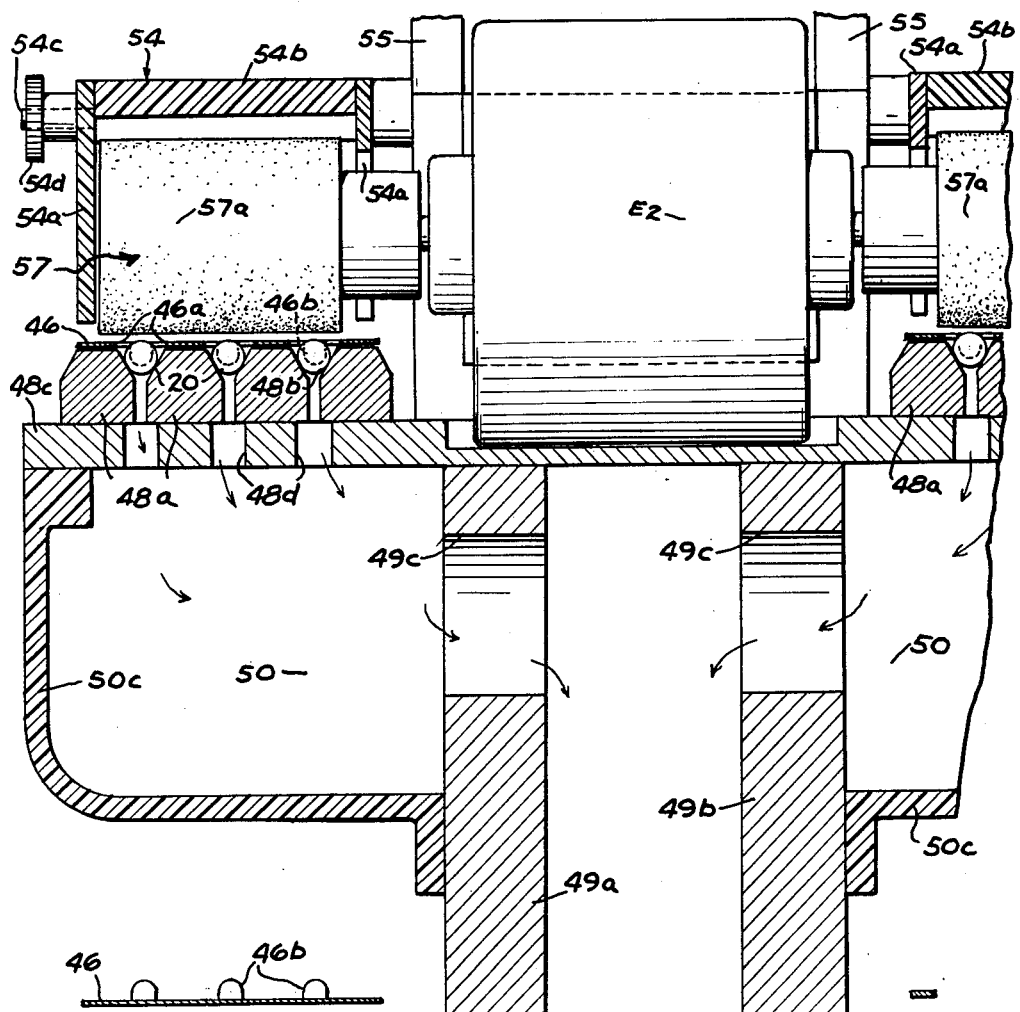
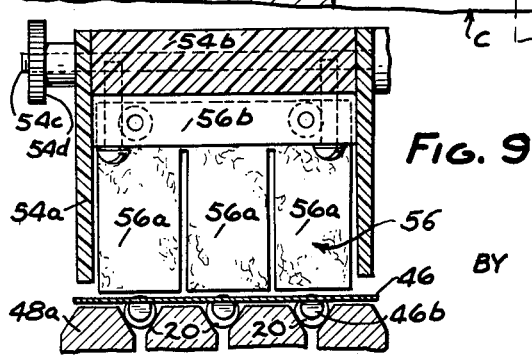
FIG. 10
FIG. 9
INVENTORS
STEWART H. McMILLAN, RALPH E. MOTTIN,
WILFRED A. SUTTON, ROBERT D. MacDONALD,
& EDWARD LINCK
BY Barnes, Kisselle, Raisch & Choate
ATTORNEYS

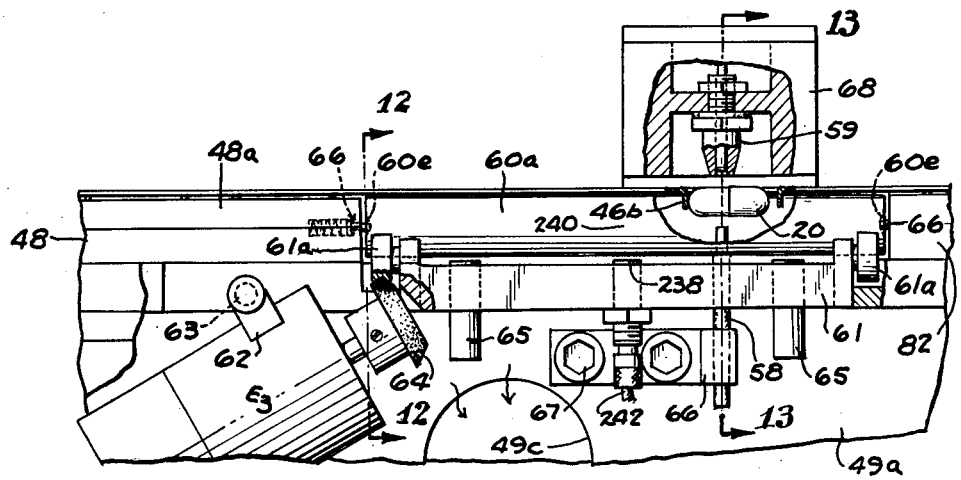
FIG. 11
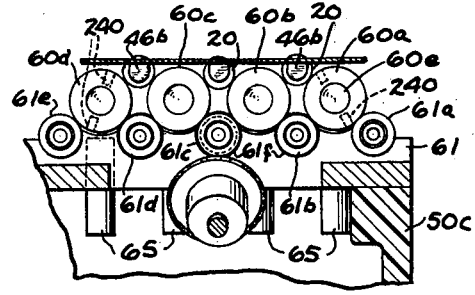
FIG. 12
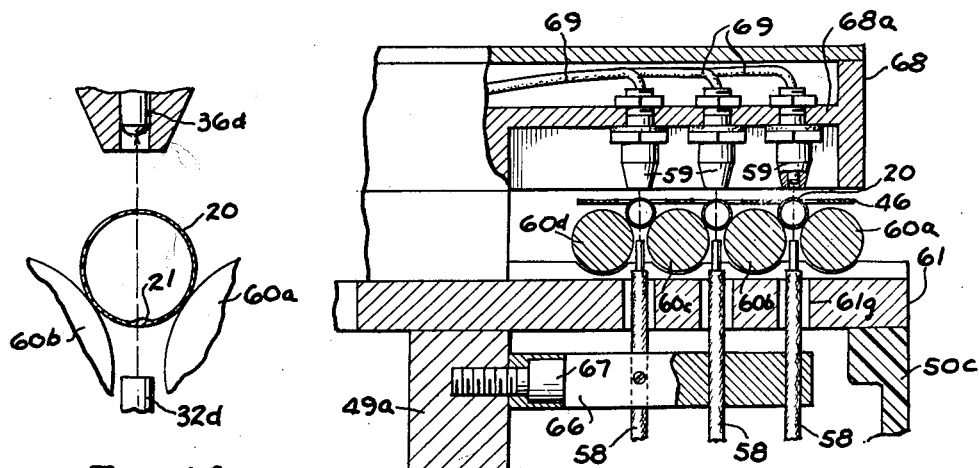
FIG. 13
FIG. 14

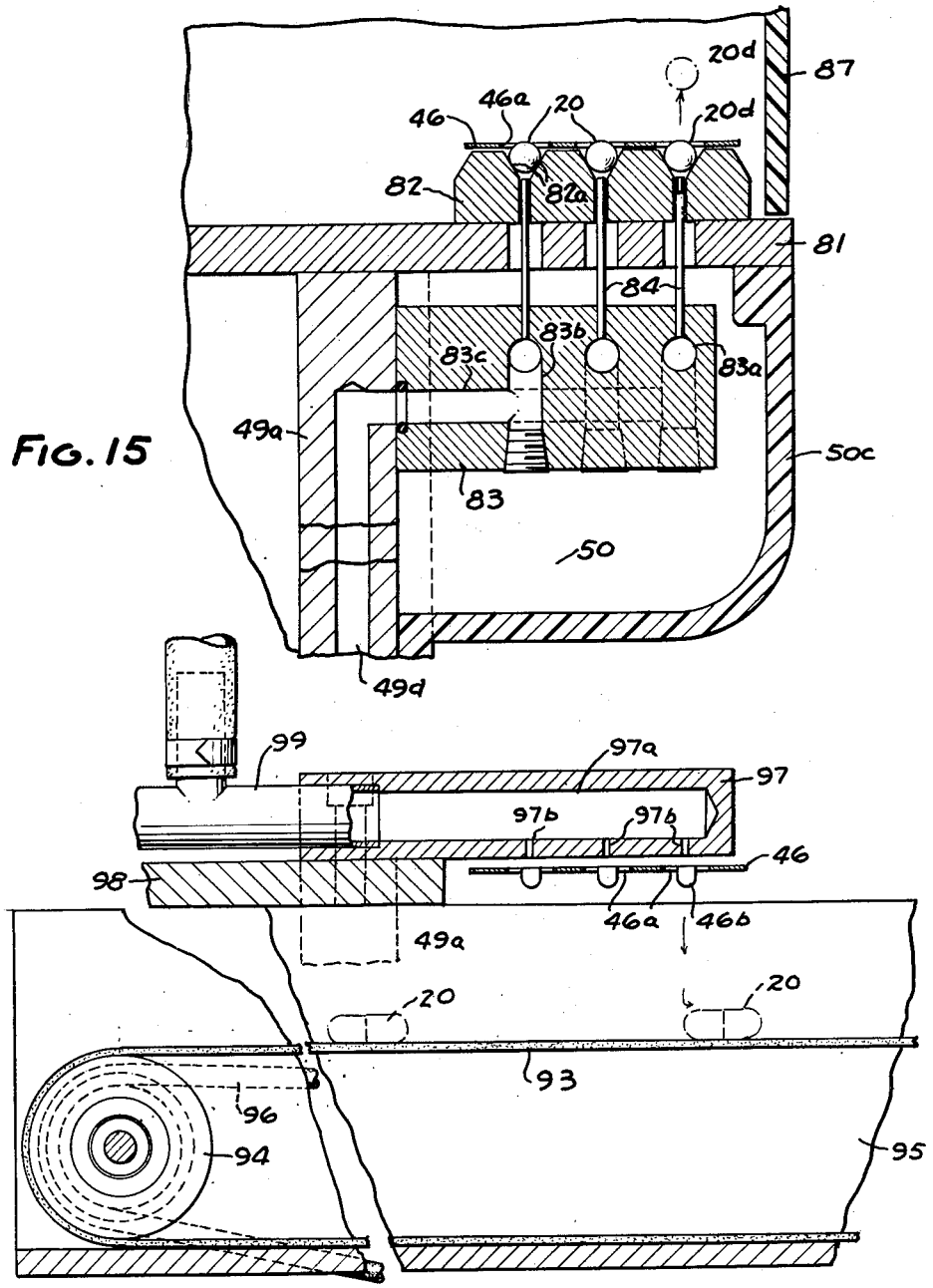

March 3, 1964 S. H. McMILLAN ETAL 3,123,217
CAPSULE INSPECTION METHOD AND SORTING MACHINE
Filed Jan. 19, 1961 10 Sheets-Sheet 10
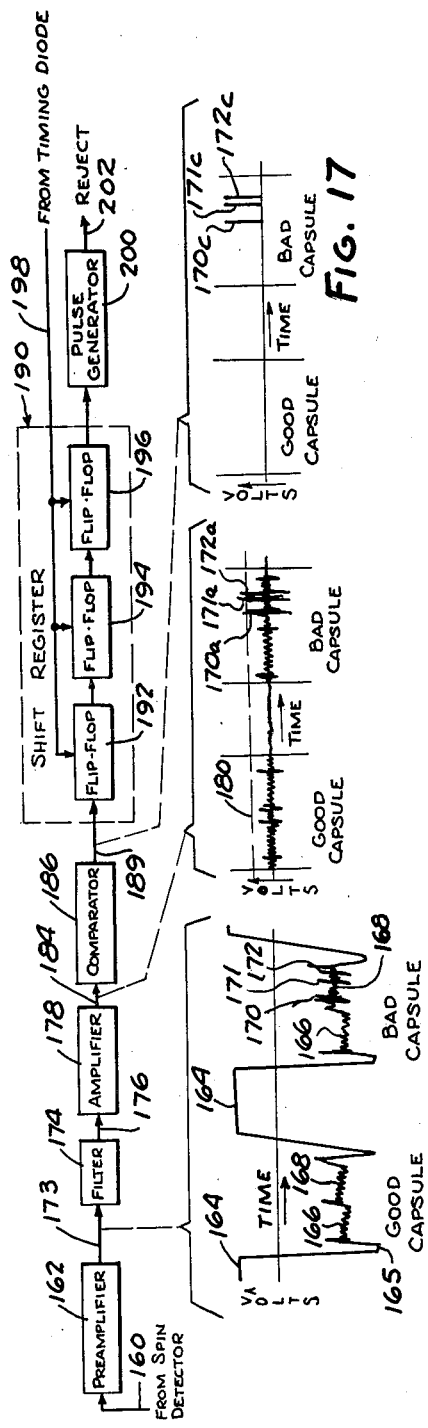
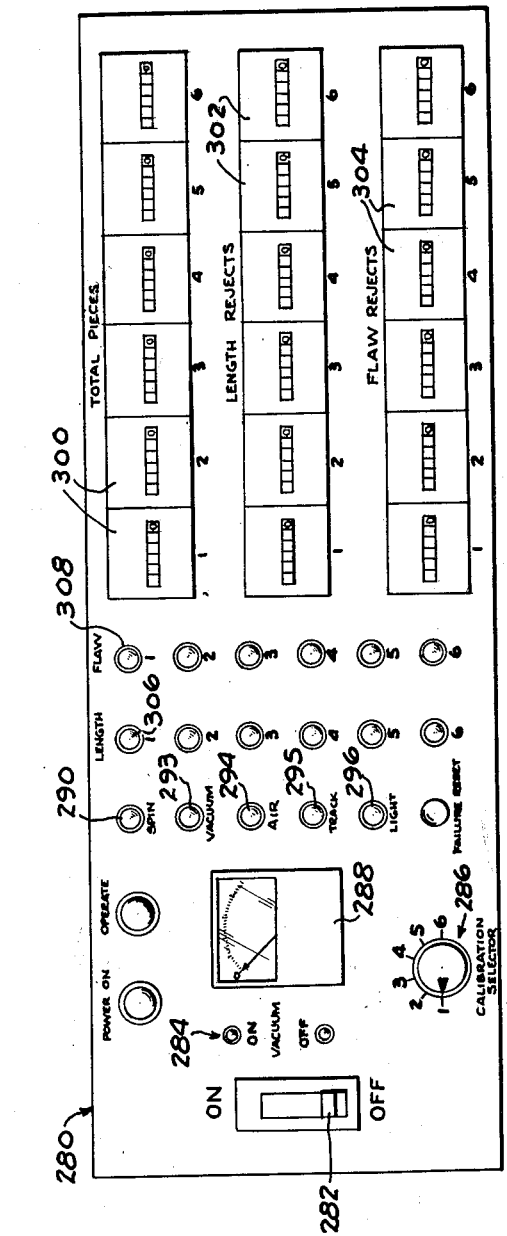
INVENTORS
STEWART H. McMILLAN, RALPH E. MOTTIN,
WILFRED A. SUTTON, ROBERT D. MACDONALD,
& EDWARD LINCK
BY
Barnes, Kisselle, Raisch & Choate
ATTORNEYS

United States Patent Office 3,123,217
Patented Mar. 3, 1964

3,123,217
CAPSULE INSPECTION METHOD AND
SORTING MACHINE
Stewart H. McMillan, Ann Arbor, and Ralph E. Mottin,
Taylor, Mich., Wilfred A. Sutton, Sunnyvale, Calif.,
and Robert D. MacDonald, Tecumseh, and Edward
Linck, Ann Arbor, Mich., assignors to Parke, Davis &
Company, Detroit, Mich., a corporation of Michigan
Filed Jan. 19, 1961, Ser. No. 83,833
21 Claims. (Cl. 209—111.5)

This invention relates to inspection methods and mechanisms, and more particularly to methods and mechanisms for automatically inspecting articles such as capsules, tubes, envelopes or the like made of gelatin, plastic, glass or other transparent or translucent materials.

The method and machine of the present invention as disclosed herein are specifically adapted to inspect gelatin capsules of the type which are used in the drug industry as ingestible containers for drugs, medicines, vitamins and other ingredients intended to be taken orally. These capsules are transparent and consist of a body tube and a cap tube each being closed at one end and telescopically assembled together to form a closed container. The capsules are made of what is customarily referred to as hard shell gelatin and may be rapidly and economically manufactured by fully automatic machinery.

However, many problems are encountered in the inspection of such capsules, some of which are inherent in the material of the capsule while other are due to the the particular method of manufacture. Hard shell gelatin capsules are capable of holding a charge of static electricity, causing adhesion to non-conductive surfaces as well as problems of attraction or repulsion between the capsules themselves. From a mechanical viewpoint, these capsules are unstable objects due to their lightness, making them difficult articles to individually handle or transport. The capsule assembly is statically unbalanced due to the body and cap tubes being of different lengths and diameters, and it also is dynamically unbalanced due to variations in wall thickness around the circumference of the capsule. In addition, gelatin capsules are adversely affected by moisture since they must be highly soluble in water. Thus, undue manual handling tends to seriously damage the polished surface and also weaken the structure of the capsules.

The capsules are fragile and therefore care must be taken to prevent the capsules from being scratched, crumpled, pierced or otherwise damaged during the inspection process, whether it be mechanical or manual. In fact, there are over twenty identifiable defects which may appear in gelatin capsules during or after their manufacture even though they have been made on fully automatic machinery. Some of these defects are as follows: chipped edges, bubbles, holes, mashed portions, flats, dirt, capsule trimmings, and improper length of the capsule assembly.

It is therefore an object of the present invention to provide an improved mechanized method for rapidly and accurately inspecting transparent or translucent objects for a wide variety of defects.

Another object is to provide a method of the above character in which the objects being inspected are continuously transported during the actual inspection thereof as well as between inspection stations, thereby eliminating the need for synchronizing and cycling equipment in the transport structure.

A further object is to provide an improved method of inspecting hard shell gelatin capsules wherein said capsules are clamped in a conveyor and ejected therefrom by the use of negative and positive air pressures, thereby providing a highly reliable mechanized transport method while reducing the risk of damage to the fragile capsules.

A still further object is to provide a rapid method for inspecting translucent or transparent objects regardless of the color thereof.

Yet another object is to provide an improved and simplified electrical system which cooperates with the mechanical equipment employed in the method of the invention to provide a highly reliable, rapid and efficient inspection process.

It is also a related and equally important object of the present invention to provide an improved inspection machine which is capable of accurately, reliably and efficiently performing all the steps of the method of the invention.

Another object is to provide an improved inspection machine which is economical to construct, operate and repair.

A further object is to provide an improved inspection machine having a fail-safe detection system which automatically shuts down the machine in case of malfunction and simultaneously indicates the trouble spot to service personnel.

Still another object is to provide an improved transport mechanism for rapidly handling fragile objects such as gelatin capsules which is also capable of segregating individual capsules from a mass thereof and feeding the same at spaced intervals between as well as at various elevations.

A further object is to provide an improved inspection machine which is capable of rotating or spinning cylindrical objects at a high rate of speed simultaneously with the transport of the objects in the direction of the axis of rotation thereof through an inspection station.

In the accompanying drawings:

FIG. 2 is a perspective view of an inspection machine provided in accordance with the invention for performing the steps of the method of the invention illustrated in FIGS. 1 and 1A;

FIGS. 3 and 3A are fragmentary side elevational views, partly in cross section, respectively illustrating the mechanical portions of the machine of FIG. 2 which perform the method steps shown in FIGS. 1 and 1A;

FIG. 4 is a cross sectional view of an inclined chute of the machine taken on the line 4—4 of FIG. 3;

FIG. 4A is an enlarged fragmentary elevational view of the transfer point between a vibratory feeder and the inclined chute;

FIGURE 5 is an enlarged fragmentary view of the length inspection and rejection stations of the above machine taken in section along the longitudinal vertical center plane of the inclined chute shown in FIG. 3;

FIG. 6 is a fragmentary cross sectional view taken on the line 6—6 of FIG. 5;

FIG. 7 is a fragmentary cross sectional view taken on the line 7—7 of FIG. 5;

FIG. 8 is a fragmentary plan view of a portion of the conveyor belt used in the horizontal transport mechanism of the machine;

FIG. 9 is an enlarged fragmentary cross sectional view taken on the line 9—9 of FIG. 3A and illustrating a baffle for seating capsules in the conveyor belt;

FIG. 10 is an enlarged fragmentary cross sectional view taken on line 10—10 of FIG. 3A showing kickback rollers and a vacuum chamber associated with the conveyor belt;

FIG. 11 is an enlarged fragmentary elevational view of the spin scanning inspection station of the machine;

FIG. 12 is a cross sectional view of the drive mechanism for the spin rollers, taken on the line 12—12 of FIG. 11;

FIG. 13 is a fragmentary cross sectional view of the spin station taken on line 13—13 of FIG. 11;

FIG. 14 is a further enlarged fragmentary view of a portion of FIG. 13 illustrating a capsule being spun and scanned for defects;

FIG. 15 is an enlarged fragmentary cross sectional view taken on the line 15—15 of FIG. 3A illustrating the rejection station for capsules found defective in the spin station;

FIG. 16 is a fragmentary cross sectional view taken on line 16—16 of FIG. 3A illustrating the accept station and portions of an endless transverse conveyor belt for delivering acceptable capsules from the machine;

FIG. 17 is a series of graphs which illustrate signal wave shapes occurring in different portions of the defect inspection circuitry shown in FIG. 1A; and FIG. 18 is a front elevational view of the control panel for the inspection machine of the invention.

*Inspection Method and General Operation of Inspection Machine*

Figure 1:
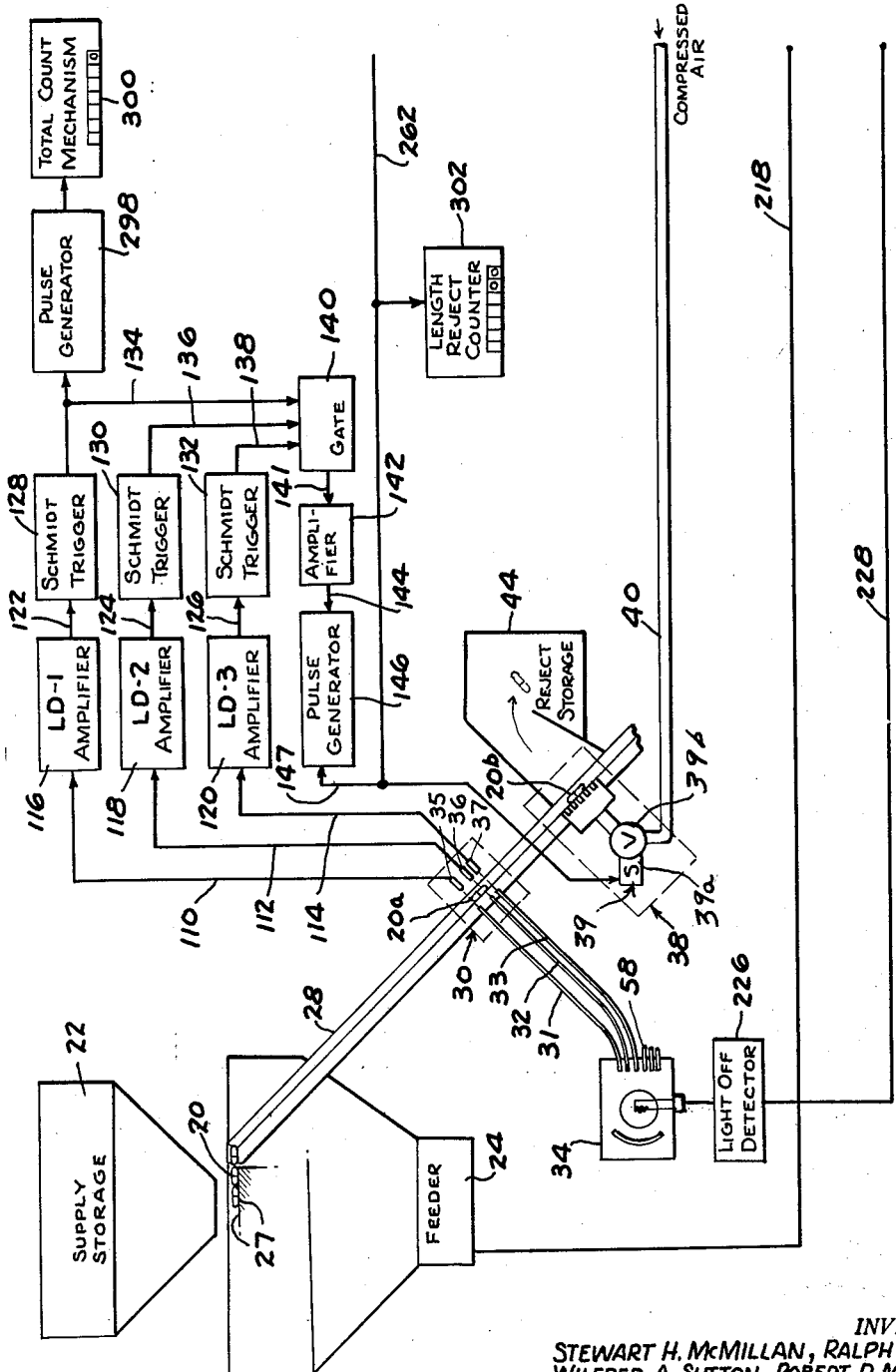
FIGS. 1 and 1A are simplified semi-schematic flow diagrams which together illustrate the inspection method of the invention, FIG. 1A being a continuation of the method steps illustrated in FIG. 1.
Figure 1A:
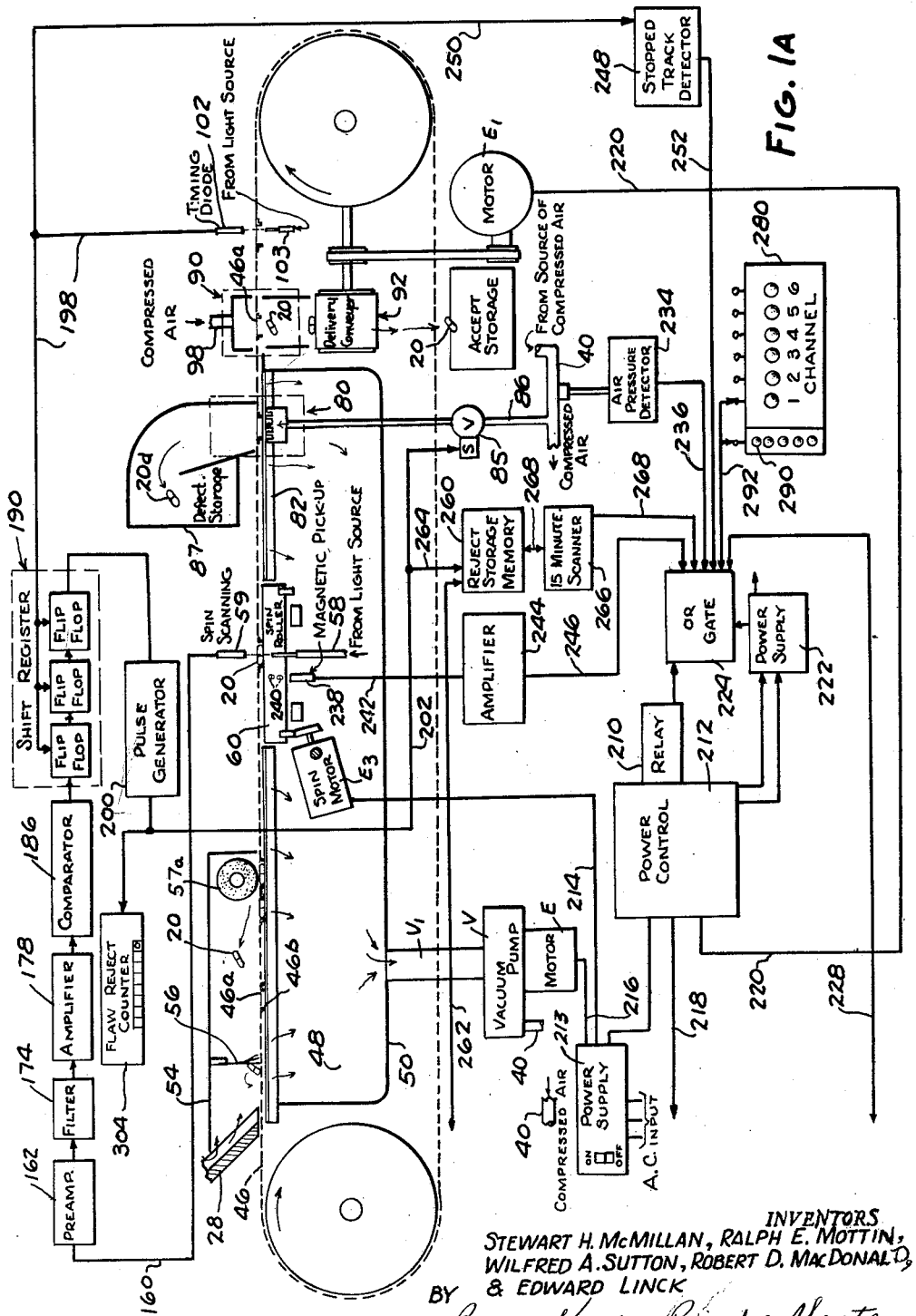

Referring successively to FIGS. 1 and 1A of the accompanying drawings, the mechanical and electrical method steps for inspecting capsules in accordance with the invention are illustrated in semi-schematic and block diagram form to facilitate understanding of the invention. The first step of the method includes gravity delivery of gelatin capsules 20 from a supply storage device 22 to a feeder mechanism 24 at an input rate substantially equal to the output of the mechanized inspection method. Feeder mechanism 24 operates to provide an output of capsules 20 aligned in single file formation on a substantially horizontal surface 27 of the feeder 24. In accordance with one feature of the invention, capsules 20 are fed one at a time at spaced intervals down an inclined chute 28 by causing the capsule to be pushed while poised on the brink of the chute by the capsule immediately therebehind. The capsules accelerate under the influence of gravity and are guided and stabilized by the chute in their descent so that the longitudinal axis of each capsule remains aligned with the direction of travel of the capsules.

In the second step of the method, capsules 20 are individually inspected for length defects while they are traveling down inclined chute 28. To perform this step, a length inspection station 30 is positioned along inclined chute 28 through which each capsule passes without any interruption of its motion down the chute.

Length detection station 30 includes suitable conduits 31, 32 and 33 for conducting radiant energy from a suitable source 34 of such energy. These conductors are positioned to project such energy from one side of chute 28 in the form of three beams lying respectively in spaced apart parallel planes disposed at right angles to chute 28, these beams being indicated by the dashed lines extending from the ends of the conductors 31, 32 and 33. On the opposite side of the chute and aligned with each of the conductors are mounted three sensing devices 35, 36 and 37. Due to the type of radiant energy utilized in this step, these beams are at least partially obstructed by the particular material of the object being inspected. The sensing devices are selected to have an electrical characteristic which is responsive to the frequency of, and which varies in accordance with the intensity of, the beam of radiant energy impinging thereon.

In order to detect capsules of improper length, conductors 31 and 32 are spaced apart in the plane of capsule travel by a predetermined distance corresponding to the minimum acceptable capsule length. Conductors 31 and 33 are likewise spaced apart but in accordance with the maximum acceptable capsule length. Hence, capsules 20 which are of correct length establish a given set of signals at the outputs of the signal sensing devices 35, 36, 37. A capsule 20a of the correct length passing through the length inspection station first diminishes the signal received by sensing device 35 and then, as the leading edge of the capsule passes the beam cast by conductor 32, the signal therefrom will also be diminished. Prior to the time when the leading edge passes the beam cast by conductor 33, the trailing edge of the capsule passes the beam of conductor 31, causing the signal output of sensing device 35 to return to the unobstructed level. This output condition in which a diminished signal is being produced at the intermediate sensing device 36 while unobstructed signals are being produced by the outer sensing devices 35 and 37 corresponds to a signal reading of a correctly sized capsule 20a. On the other hand, a signal output condition in which diminished signals are being received from all three sensing devices indicates an overlength capsule, while a signal condition in which the output of sensing device 35 changes from a diminished to an undiminished level prior to any change in the undiminished signals being produced by sensing devices 36 and 37 indicates an underlength capsule. These latter two sets of signal conditions therefore represent capsules of improper length, and by length inspection circuitry to be described subsequently in greater detail, a reject signal is generated when these conditions occur which is transmitted to a length rejection station 38.

Reject station 38 includes a mechanism, which, in response to the output signal from the length inspection circuitry, admits a cross blast of compressed air into the bottom of chute 28 as an improper length capsule 20b enters the reject station. The jet of air lifts capsule 20b off the chute and carries it into a reject storage hopper 44. Capsules 20a of the correct size pass on through the length rejection station and continue on down chute 28.

Referring to FIG. 1A, the lower end of inclined chute 28 terminates a slight distance above the upper run of an endless conveyor belt 46. Capsules 20 descend directly from chute 28 to the horizontal surface of belt 46, belt 46 having a row of longitudinally spaced openings or slots 46a therein which are aligned with chute 28 and which are of the correct length to receive proper length capsules 20 therein. The openings in belt 46 are oriented so that capsules received therein have their longitudinal axes aligned with the direction of capsule travel. An open track structure 48 is disposed beneath the surface of the upper run of belt 46 to support the capsules in openings 46a. Another feature of the method of the invention is to run conveyor belt 46 at a speed such that approximately twice as many openings 46a travel past the lower end of chute 28 as there are capsules arriving at the end of the chute. Thus each capsule has two targets, thereby eliminating the possibility of capsules piling up on the belt.

In order to rapidly and reliably seat individual capsules in openings 46a of the conveyor belt, a negative air pressure or vacuum system is provided which causes a constant flow of air through openings 46a and into a vacuum chamber 50, as indicated by the arrows in FIG. 1A. Once the capsules 20 are seated by the air stream in slots 46a they remain vacuum clamped therein during the entire travel thereof over chamber 50. Capsules are transported by belt 46 in the vacuum clamped condition a distance sufficient to stabilize the capsules in the slots prior to reaching the next inspection station.

The next step in the method of the invention is to spin the capsules about their longitudinal axis while linearly transporting the same. While the capsules are traveling along track 48 the angular velocity of the capsules is substantially zero. As the capsules are carried past the end of track 48 they engage and are supported by a pair of parallel spin rollers 60 which are spaced laterally apart and aligned so as to form a continuation of supporting track 48. Rollers 60 are rotated at a predetermined angular velocity so that capsules traveling between adjacent rollers are spun by frictional contact therewith so that the capsule has an angular surface velocity transverse to the direction of transport which substantially exceeds the linear transport velocity thereof. The vacuum system serves to hold the capsules in place between the spin rollers and insures a good frictional driving contact.

Inspection for all capsule defects except those of improper length is performed while the capsules are simultaneously being spun and transported. In accordance with this step of the method, a beam of radiant energy to which the particular object being inspected is permeable is projected through the longitudinal center plane thereof. The radiant energy preferably includes wave lengths in the infra-red region (wave lengths within the range of 7600 to 100,000 angstroms) which are transmitted by translucent or transparent objects without being influenced by differences in the color thereof. A detection system is thus provided which is insensitive to color variation in the product being inspected, thereby permitting inspection of multi-color assortments of capsules or successive runs of differently colored capsules without changing the setup of the inspection stations.

Infra-red radiation is transmitted from light source 34 to the spin scanning station in a manner such that a fixed beam of infra-red radiation penetrates each capsule over the entire length thereof as the capsule moves past the beam. A sensing device 59 is mounted in a position with respect to the capsule transport path to receive the beam cast through the capsule. The output of sensing device 59 is an electrical signal having an amplitude proportional to the intensity of the beam of infra-red radiation received by the sensing device. It has been found that a wide variety of defects or flaws in the capsules directly affect the amount of infra-red radiation absorbed by the capsule as it passes through the fixed beam. Hence, detection of such defects is made possible through the use of defect inspection circuitry connected to the sensing 59 which translates the high amplitude, defect indicating portions of the signal from sensing device 59 into an actuating signal. This circuitry also translates the actuating signal into a delayed rejection signal which occurs after a defective capsule being inspected has moved from the spin scanning station to a defect rejection station 80. The details of the electrical system for effecting this translation of the scanning signal will be explained subsequently in greater detail.

The defect rejection station 80 includes suitable apparatus for supplying compressed air to a point beneath the conveyor belt 46 and between an open track structure 82. The output signal from the defect inspection circuitry serves to actuate this apparatus so that compressed air lifts and carries a defective capsule 20d upwardly into a defect storage hopper 87. It is to be noted that the capsules are vacuum clamped during the transport thereof along track 82 and through the defect rejection station.

Acceptable capsules 20 continue on through the defect rejection station until they reach an accept station indicated at 90. Here the capsules are no longer supported from beneath by track 82 and hence they fall out of openings 46a and drop onto the upper run of an endless belt delivery conveyor 92 located beneath accept station 90. Conveyor 92 carries capsules 20 to the end thereof where they drop off into an accept storage bin.

Detailed Description of Inspection Machine

Referring now to FIG. 2, there is shown a machine constructed in accordance with the present invention for inspecting translucent or transparent objects of generally cylindrical shape, such as the aforementioned hard shell gelatin capsules 20. This capsule inspection machine is capable of efficiently performing all of the steps of the above described method and it does so in each of six channels arranged side-by-side in a pair of three-channel tracks, thereby achieving a high rate of production with a minimum of cost. Inasmuch as each channel is a substantial duplicate of every other channel, those features common to each channel will be described only with reference to a single illustrative channel. Some of the reference numerals which were applied to general structure described in connection with the above inspection method are hereafter re-applied to corresponding specific structure of the machine of the invention.

The inspection machine is preferably arranged as a self-contained unit with the only outside connections being to a suitable source of electrical power. The mechanical equipment for transporting and inspecting the capsules is mounted on the top of a cabinet C while the length and defect inspection circuitry is mounted in a separate module M for each channel. Each module M is contained in a vertical chassis slidably mounted for ease of access within cabinet C and at one side thereof. Also enclosed within cabinet C are a vacuum pump V driven by an electric motor E as well as other equipment not directly involved in handling the capsules. Mounted on the top of cabinet C at one end thereof are a pair of capsule supply storage bins 22 into which are placed quantities of gelatin capsules which are to be inspected for the existence of a variety of possible defects. Storage bins 22 have a funnel shaped outlet so as to provide a continuous gravity flow of capsules to a vibratory feeder 24 at a rate approximately the same as the output inspection rate of the machine.

Capsule Feeding Mechanism

Vibratory feeder 24 is shown in FIG. 3 and may comprise a commercially available unit such as that sold under the trademark PEECO by Automation Devices, Incorporated, of Erie, Pa. This feeder includes a bowl-like hopper 25 spring mounted on vibrator 26 which, at the rate of 60 cycles per second, rotates hopper 25 through a very small angle in one direction while simultaneously lifting the hopper, and then reverses this motion to return the hopper to its initial angular position and elevation. These vibrations are isolated from the rest of the inspection machine by shock mounting vibrator 26 on rubber feet 26a. The perimeter of hopper 25 is provided with three inclined ramps 27 each in the form of a spiral which runs from the flat bottom surface of the hopper and terminates at the upper, outer edge of the hopper. Capsules fed to the center of the bottom surface of the hopper from storage bin 22 migrate to the bottom ends of ramps 27 and creep up the ramp due to the particular oscillatory motion of the hopper, the feeder thereby delivering a single file of capsules 20 to each of the upper, output ends of ramps 27.

A pair of inclined chutes 28, one for each feeder 24, is positioned with the upper ends thereof closely adjacent but not touching the output ends of ramps 27 so as to each receive three lines of capsules 20 being fed therefrom. Inclined chutes 28 each have three V-shaped grooves 28a (FIG. 4) in the upper surface thereof for guiding the capsules as they fall with their longitudinal axes aligned in the direction of capsule travel. The grooved surfaces of chute 28 are highly polished to facilitate sliding movement of the capsules and to reduce the likelihood of damage thereto.

As shown in FIG. 4A, a V-groove 28b having a length at least equal to half the average overall length of capsules 20 is provided in chutes 28 at the upper end of each inclined V-groove 28a. Since chute 28 is supported on a relatively steady portion of the machine, and since the upper end of the chute does not touch the upper end of ramp 27, the horizontal V-groove 28b provides a non-vibrating support or "dead plate" for receiving capsules one at a time from ramp 27. Capsules are propelled into horizontal groove 28b by the motion of ramp 27. Once a capsule is clear of ramp 27 and is supported in horizontal groove 28b it is no longer subject to vibrational motive forces. In order for a capsule resting in horizontal groove 28b to be advanced over the edge thereof onto the inclined portion of chute 28 it must be pushed over by the next capsule propelled off the upper end of vibratory hopper ramp 27. Thus, the interposition of a steady horizontal surface between the vibrating ramp and the inclined groove insures that only one capsule at a time enters the inclined portion of chute 28, that each capsule in such portion of the chute is spaced from the next capsule, and that capsules do not tumble down the chute from being fed too fast over the edge of the horizontal portion 28b.

*Length Inspection Mechanism*

After a capsule has fallen approximately halfway down chute 28 and thus has had sufficient time to stabilize itself in the groove, it enters a length inspection station 30. Length inspection station 30 is shown in detail in FIGS. 5 and 6 and consists of a housing 30a containing a shelf 30b in which nine photo diodes are arranged and supported in three groups each having three diodes 35, 36 and 37 pointing into one of the grooves 28a in chute 28. Shelf 30b is slotted to receive a pair of diode mounting blocks 30c and 30d which are suitably drilled to receive the diodes and which are slotted to receive screws 30e for adjustably fastening the mounting blocks on the shelf. On the underside of chute 28 beneath housing 30 another pair of mounting blocks 30f and 30g are similarly fastened to chute 28 so to adjustably support the ends of infra-red conductors 31 and 33. An intermediate conductor 32 is supported in a hole drilled at an angle through chute 28. Each groove has two spaced apart slots 28c therethrough which respectively receive conductors 31 and 33 for adjustment longitudinally of the chute to establish maximum and minimum length limits as well as acceptance tolerances for the capsules being inspected.

The conductors 31, 32, 33 are preferably light tubes of the type known as "fiber optics" which consist of very small diameter glass strands or fibers which are individually cut and joined together to form a bundle of parallel fibers which are then encased by an outer opaque protective coating. These fiber optics are very flexible and yet transmit light from one end to the other with high efficiency. For capsule inspection purposes it is not necessary to transmit an image through the fiber optic and therefore the orientation and quality of the fiber is not critical, allowing the use of less expensive grades of fiber optics. Hence the light emitted from the output end of the fiber optic tube may be scrambled light and may diverge at an angle of about 30° from the end of the tube. However, this provides a sufficiently narrow beam for length inspection inasmuch as the spacing between the output end of the fiber optic tubes and the particular photo diode opposite thereto is only slightly greater than the diameter of the capsules.

The infra-red sensing devices 35, 36, 37 are preferably semi-conductor photo diodes which are tiny cylindrically shaped objects of small diameter having an input aperture at one end of the cylinder and electrodes attached and led away from the other end. The small diameters of the fiber optics 31, 32, 33 and photo diodes 35, 36, 37 (approximately ⅛ and 1/16 inch respectively) permit a compact arrangement of the same in the length inspection housing 30a. The semi-conductor photo diodes are made of silicon and are inherently more sensitive to infrared radiation than to visible light.

A light source 34 for length inspection is mounted within cabinet C which preferably includes a standard high quality industrial type incandescent lamp bulb having a polished reflector enclosed within the glass envelope thereof. Since parallel light is not needed in the length inspection station, no lenses are needed in the light source. Also, since ordinary incandescent light bulbs emit a great deal of infra-red radiation as well as visible light waves, infra-red is obtained without special equipment. The input ends of the fiber optics 31, 32, 33 need only be mounted in fixed position in the beam cast by lamp 34.

The above features of the length inspection station 30 of the capsule inspection machine permit use of a standard light bulb and a standard photo diode for generating and detecting infra-red radiation. Because of the sensitivity characteristic of the diode, no filter is needed to remove wave lengths other than infra-red, and therefore the inspecting beam may contain visible light without hindering the inspection. As mentioned earlier, infra-red radiation is transmitted equally by gelatin capsules of all colors, and hence use of radiation of this wave length provides a simple method of eliminating the color characteristic from the flaw characteristics being detected in the product by the inspection machine. The input arrangement of the diode is such that it receives light from a narrow angle of field and this feature allows the use of a compact arrangement of the fiber optics without cross over occurring in the beam cast by adjacent fiber optics.

Length inspection station 30 operates in accordance with the length inspection method of the invention described above. The electrodes connected to the output end of diodes 35, 36, 37 are connected to length inspection circuitry to be described subsequently in detail, which circuitry actuates a capsule ejection mechanism in order to remove improper length capsules 20b from chute 28. Inasmuch as length inspection station 30 operates from signals caused solely by the leading and trailing edges of a capsule passing successively through the three beams, it is to be understood that opaque as well as transparent objects may be inspected. Also, a type of radiant energy other than infra-red may be used in the length inspection station even for a multi-colored assortment of capsules as long as the electrical circuitry is adjusted for actuation by the minimum signal change caused by those capsules which absorb the least amount of radiant energy.

*Mechanism for Rejecting Improper Length Capsules*

Length rejection station 38 is shown in detail in FIGS. 5 and 7 and is located immediately below length inspection station 30. The location of station 38 is determined by the characteristic delay time of the length detection and relay circuits, including the operating delay in a reject solenoid and valve mechanism 39, and by the speed at which capsules 20 travel down incline chute 28. The solenoid and valve mechanism 39 is of conventional construction and is located within cabinet C remote from the reject station and operates to open and close a compressed air line 40. The output end of air line 40 is threadably received in a port 41a in a cover plate 41 mounted beneath chute 28. Port 41a leads into a manifold chamber 28e whihch extends beneath the V-shaped grooves 28a of chute 28. Manifold 28e distributes air to a row of small holes 28f which extend upwardly from manifold 28e into the bottom of groove 28a. These holes 28f subdivide the single stream of air from pipe 40 into a series of fine air jets, thereby minimizing the volume of ejection air while maximizing the velocity thereof so that length defective capsules 20b are reliably ejected from groove 28a into a length reject hopper 44 (FIG. 3). Hopper 44 is mounted about and extends away from the lower portion of chute 28, the length reject portion of hopper 44 terminating at a transverse partition 44a which preferably consists of a loosely hung gauze screen to prevent the ejected capsules from bouncing back into chute 28. Rejected capsules 20b are removed from hopper 44 via an opening 44b in the side of the hopper. Capsules 20 of correct length pass on through rejection station 38 and continue down inclined chute 28 which feeds the capsules directly to a horizontal transport mechanism located beneath chute 28.

*Horizontal Transport Mechanism*

Referring to FIG. 3A, the horizontal capsule transport mechanism includes an endless all-metal conveyor belt 46 made of a thin band of metal suitably heat treated to have high flexibility. Belt 46 is supported on and frictionally driven by a driving drum 47a and an idler drum 47b which are journalled at the ends of a pair of long, vertical plates 49a and 49b mounted on the top of cabinet C (FIG. 10). The drive mechanism for conveyor belt 46 consists of standard units including an electric motor $E_1$, a reduction gear mechanism R, a driving belt B and a double right angle drive unit D which transmits power to the pair of driving drums 47a required to run a two belt machine. The provision of an integral metallic conveyor belt is advantageous in that, unlike a chain belt, it requires no lubrication inasmuch as flexing occurs internally in the belt. Also, it is easier to align than a chain belt and does not present a sagging problem.

As best seen in FIGS. 8, 9 and 10, belt 46 is provided with three longitudinally extending rows of slots 46a which are spaced laterally for alignment with the triple grooves 28a of inclined chute 28. Each slot 46a is sufficiently long to receive one capsule assembly 20 therein, and is slightly wider than the diameter of capsule 20 to allow it to drop through the slot. At each end of slots 46a there is an integral tab 46b which is bent inwardly at right angles to the surface of belt 46 to form end walls for retaining the capsules in the slots. Each of the belt drums 47a, 47b is triple grooved to receive the three rows of tabs 46b, the solid portions of the belt between each longitudinal row of slots 46a riding on lands of the drum adjacent the grooves thereof as belt 46 runs around the drums. The upper course of belt 46 runs over a track structure 48 comprising four longitudinally extending bars 48a which are beveled along their upper edges to provide the inclined sides of three V-shaped grooves 48b each of which is disposed beneath a longitudinal row of slots 46a. Bars 48a are spaced from each other a predetermined distance so that the bottom of each groove 48b is open throughout its length. Bars 48a are supported on a plate 48c having longitudinal slots 48d communicating with the gaps between the bars. The distance between the bars is such that a capsule 20 received in groove 48b is slidably supported on the inclined surfaces thereof, the capsule being pushed and retained lengthwise by belt tabs 46b which extend into grooves 48b. Preferably the beveled upper edges of bars 48a, like inclined chute 28, are highly polished to facilitate sliding movement of the capsule without damage thereto.

A vacuum chamber 50 is provided beneath each of the conveyor belts 46 which extends from a forward wall 50a thereof located beneath the lower end of chute 28 to a rearward wall 50b thereof located just ahead of a delivery conveyor 93. These end walls are integral with the side and bottom walls of a casting 50c, one casting being supported on the outer side of each of the parallel plates 49a, 49b. Several large orifices 49c extend through each of plates 49a, 49b which provide air passages between vacuum chambers 50 and the space between plates 49a, 49b. The bottom of this space connects with the inlet pipe $V_1$ of vacuum pump V. Negative pressure in inlet $V_1$ causes a constant flow of air from the atmosphere through slots 46a of conveyor belt 46 into the V-shaped grooves 48b, down through the gaps between bars 48a, into vacuum chambers 50 and via orifices 49c into the space between plates 49a, 49b. Thus, each slot 46a forms the inlet orifice to this vacuum system and the air-pressure differential existing thereacross serves to draw and hold capsules 20 in the slot as they are pushed along the beveled edges of bars 48a.

*Conveyor Loading Mechanism*

The direct transfer of rapidly descending capsules from inclined chute 28 to a horizontal transport position in slots 46a of the rapidly moving conveyor belt is achieved in a reliable manner by the provision of a transfer mechanism including a transparent housing 54 which overlies the lower end of chute 28 and the upper surface of conveyor belt 46 adjacent thereto. As best shown in FIGS. 3A and 10, housing 54 comprises a pair of vertical side walls 54a spaced apart by a horizontal top wall 54b and held in assembled relation by a pair of studs 54c having knobs 54d threadably received on the outer ends thereof. The inner ends of studs 54c are secured to a U-frame 55 which rests on plate 48c intermediate belts 46, U-frame 55 also serving as the support for the lower ends of chutes 28. A transverse vertical wall 54e encloses the rear end of housing 54 while chute 28 forms the forward wall of the housing. Housing 54 retains the capsules over the upper run of conveyor belt 46 until they are seated in slots 46a of the belt. Housing 54 causes a high pressure differential to exist where the V-grooves 28a of chute 28 enter the housing so that a rapidly moving air stream enters at this point and then exits through slots 46a in the conveyor belt. Hence, when the capsules enter the portion of grooves 28a within housing 54 they are confined therein and guided by the air stream into slots 46a.

Two additional devices are provided within housing 54 to assist this homing action. A comb 56 (FIG. 9) comprising a flexible rubber baffle or tongue 56a for each longitudinal row of slots 46a is hung vertically over belt 46 from a transverse bar 56b. Comb 56 catches those capsules which fail to initially seat correctly in slots 46a. It also serves as a backstop for those capsules which bounce off the unslotted portions of belt 46 and contains them within a "settling" area between chute 28 and the comb. A kickback roller mechanism 57 (FIG. 10) is located further along belt 46 near the rearward end of housing 54 which includes an electric motor $E_2$ located intermediate belts 46. Motor $E_2$ has a double-ended drive shaft which extends transversely into housing 54 and on which a pair of rollers 57a are mounted for rotation therewith. Rollers 57a are made of soft rubber and are positioned so that the bottom circumference of the roller is spaced slightly above the upper surface of the belt. Rollers 57a are rotated in a direction opposite to the movement of the belt surface tangential thereto (clockwise as viewed in FIG. 3A) so that capsules which are incorrectly seated in slots 46a or which have failed to enter a slot are kicked back to the rear side of comb 56 and are thereby given another chance to home in the slots. Thus, only capsules which are correctly seated within slots 46a are permitted to move onward past rear wall 54e of housing 54 to the next stage of the horizontal transport mechanism.

*Capsule Spinning and Scanning Mechanism*

Referring to FIGS. 11–14 as well as to FIG. 3A, the next stage of the inspection machine includes a capsule spinning mechanism which rotates the capsules about the longitudinal axis thereof without interrupting horizontal transport of the capsules. In order to accomplish this compound motion, four horizontal and parallel spin rollers 60a, 60b, 60c and 60d are each positioned in alignment with one of the four beveled track bars 48a so that the lateral spacing between adjacent rollers forms an extension of the V-shaped grooves 48b formed between bars 48a. Spin rollers 60a, 60b, 60c, 60d are rotatably supported by two sets of five short rollers 61a, 61b, 61c, 61d and 61e each rotatably supported on ball bearing assemblies mounted at the ends of a cradle frame 61. As best seen in FIG. 12, the center roller 61c at the forward end of the cradle frame 61 and the rollers 61b and 61d adjacent thereto are each peripherally grooved to receive a rubber O-ring 61f thereon which provides a resilient frictional contact between short rollers 61b, 61c and 61d and spin rollers 60a, 60b, 60c and 60d. The outermost short rollers 61a and 61e have a smooth polished cylindrical metal surface which rolls against the cylindrical surface of outermost spin rollers 60a and 60d. Short center roller 61c rotates the two middle spin rollers 60b and 60c in the same angular direction and these spin rollers in turn drive short rollers 61b and 61d which rotate the outermost spin rollers 60a and 60d with the same angular velocity and direction as spin rollers 60b and 60c. The outermost short rollers 61a and 61e serve merely as idlers for rotatably supporting outermost spin rollers 60a and 60d.

An electric drive motor $E_3$ is hung beneath bars 48 by a mounting bracket 62 secured thereto and journalled on a transverse shaft 63. The center of gravity of motor $E_3$ is forward of bracket 62 so that the weight of the motor is utilized to urge a bevelled driving wheel 64 affixed to the motor drive shaft upwardly against the center drive roller 61c. This pivotable mounting of the motor thus provides a simple friction clutch arrangement to prevent damage in the event of the spin rollers becoming jammed, and also provides a drive which is self-adjusting for wear. The provision of a frictional drive system for the spin rollers eliminates lubrication problems and minimizes the cost of replacement parts.

Spin rollers 60a, 60b, 60c, 60d are held vertically and laterally in place on the short rollers by the weight of the spin rollers and by magnetic attraction to permanent bar magnets 65 which are vertically mounted in longitudinally spaced positions in cradle frame 61 so that a pair of magnets 65 is positioned directly beneath each of the spin rollers. In order to prevent endwise movement of the spin rollers, the ends of each spin roller are countersunk to provide recesses 60e into each of which a spring loaded pin 66 projects from its slide mounting in the ends of bars 40 and 82. Under ideal conditions with the spin rollers in perfect alignment there is little or no contact between pins 66 and the ends of the spin rollers. However, pins 66 do engage the sides of recesses 60e to hold the spin rollers in place when, for example, a foreign object drops between the rollers. The conical shape of recesses 60e causes pins 66 to retract against their springs when the spin rollers are lifted upwardly to remove the rollers for servicing. With this suspension arrangement, it is a simple matter to replace the spin or short rollers as they wear out.

In operation, spin rollers 60a, 60b, 60c, 60d are rotated at an angular velocity of approximately 7000 r.p.m. for a belt speed of approximately 300 slots per minute. Capsules 20 arriving at the ends of bars 48 with substantially zero angular velocity are pushed by belt tabs 46b into the spaces between adjacent spin rollers. Due to the negative air pressure in the vacuum chamber 50, a high velocity air stream is maintained between the spin rollers which holds the capsules in position and in frictional driving contact therewith. During travel of the capsules along the first half of the length of the spin rollers, the capsules accelerate from zero to approximately 14,000 r.p.m., depending upon the ratio of the spin roller diameter to capsule diameter and the slippage losses in the frictional drive. During travel of the capsules over the last half of the spin rollers they continue to spin at full velocity while being simultaneously inspected for all defects other than for improper length.

As shown in detail in FIGS. 11 and 13, a fiber optic 58 is positioned so that its output end terminates just below the spin space between each of the spin rollers 60a, 60b, 60c, 60d. Fiber optics 58 are adjustably supported in an L-shaped bracket 66 which is fastened to plate 49a by a pair of cap screws 67, and suitable slots 61g are formed in cradle 61 to permit insertion of fiber optics vertically therethrough. The input ends of fiber optics 58 are mounted to receive infra-red radiation from a suitable light source, such as light source 34 previously described or a duplicate thereof positioned physically closer to the spin inspection station. The infra-red radiation transmitted by fiber optics 58 is projected in a vertical beam from each of the output ends thereof so that the beam penetrates capsules 20 along the center longitudinal plane thereof as they are advanced over the beam by belt 46. The ratio of transport speed to spin speed of the capsules is determined so that the beam circumferentially scans a predetermined increment of axial length thereof for every three revolutions of the capsule. Three photo diodes 59 are supported on a shelf 68a enclosed within the overhanging arm of a housing 68 which is supported on the portion of cradle frame 61 lying between conveyor belts 46. Each diode 59 is positioned directly opposite one of the fiber optics to receive the beam cast therefrom. The photoelectric signals generated by diodes 59 in response to the beam are conducted by lead wires 69 to defect inspection circuitry contained in modules M, this circuitry being described in detail hereinafter.

*Mechanism for Rejecting Defective Capsules*

Referring to FIG. 15, a capsule rejection station is shown which is located a predetermined distance beyond the point at which capsules 20 are scanned by the infra-red inspection beam. The rejection station includes a horizontal plate 81 which is supported on vertical plates 49a and 49b and extends laterally therefrom to form the top rear cover of vacuum chamber 50. Four longitudinally extending track bars 82 are supported in laterally spaced apart positions on plate 81 with each bar in alignment with one of the spin rollers 60a, 60b, 60c, 60d in a manner identical to the alignment of track bars 48 positioned ahead of the spin rollers. Capsules 20 are pushed by belt 46 from between the spin rollers into the V-grooves 82a formed by the beveled upper edges of bars 82, the vacuum system still being effective to maintain the capsules clamped in slots 46a of belt 46.

Beneath bars 82 and within vacuum chamber 50 a manifold block 83 is bolted to the outer side of vertical plate 49a. Manifold block 83 has three longitudinally extending internal air bores 83a located directly beneath each of V-grooves 82a. A longitudinal row of vertical tubes 84 extend upwardly from each air bore 83a and terminate at the bottom of each groove 82a. Each air bore 83a also communicates with a vertical air bore 83b which is connected via a horizontal air bore 83c to an internal air passage 49d provided in plate 49a. Air passages 49d communicate via suitable piping with solenoid operated air valves 85 (FIG. 3A) which control the flow of compressed air from a compressed air line 86 to air passages 49d. When a defective capsule 20d arrives over the row of air tubes 84, valves 85 are opened by their respective solenoids in response to an actuating signal received from the defect inspection circuitry, thereby causing a blast of compressed air to issue from tubes 84 in the form of high velocity jets which eject defective capsule 20d upwardly from between bars 82 and into a reject hopper 87. Reject hopper 87 is constructed integrally with reject hopper 44 and is separated internally therefrom by the gauze screen 44a. An opening 87a is provided in the side of hopper 87 for removing rejected capsules.

*Mechanism for Removing Acceptable Capsules*

Completely inspected and fully acceptable capsules are pushed by belt 46 past the reject station to the ends of bars 82 which terminate in a capsule accept station shown in FIGS. 3A and 16. The ends of bars 82 overhang an endless conveyor belt 93 which runs transversely of and between the upper and lower runs of conveyor belts 46. Conveyor belt 93 runs on a pair of drums 94 which are journalled in a pair of spaced apart vertical side plates 95 which extend through suitable openings in plates 49a and 49b and receive support therefrom. One of the drums 94 is driven by a belt 96 which connects with a drive pulley of the double right angle drive D. A manifold block 97 is bolted to a plate 98 so as to overhang both conveyor belts 93 and 46. Manifold 97 has a horizontal air bore 97a therein which connects a compressed air line 99 with three rows of vertical holes 97b drilled in the bottom side of manifold 97 directly over the longitudinal rows of slots 46a of belt 46. Capsules carried past the ends of bars 82 fall from slots 46a onto the upper run of belt 93, the air jets issuing from holes 97b serving to dislodge any capsules which are stuck in the belt 46. Acceptable capsules are thus collected from each of the six channels of the inspection machine and are carried to the end of delivery belt 93 where they drop off into a storage bin, not shown.

Timing Mechanism

Transport conveyor belt 46 runs empty beyond delivery conveyor belt 93 through a timing mechanism 100, shown in FIG. 3A. Timing mechanism 100 consists of a housing 101 positioned transversely over belts 46 in which a pair of photo diodes 102 is supported, each diode being aligned with one longitudinal row of belt slots 46a in the respective belts. A pair of fiber optics 103 is likewise aligned with longitudinal rows of belt slots 46a by adjustably fastening the fiber optics in a mounting block 104 supported beneath belt 46. The input ends of fiber optics 103 are mounted in the same light source as is used to generate infra-red radiation for fiber optics 58. The output end of each fiber optic 103 casts a beam of infra-red radiation through each belt slot 46a as it passes thereover, the slotted conveyor belts 46 thereby causing timing signals to be generated by diodes 102 which are utilized in the defect inspection circuitry associated with the spin inspection stations of each belt 46.

In addition to generating a timing signal, the movement of conveyor belt 46 is used for cleaning the output ends of fiber optics 58 and 103. As shown in FIGS. 3A and 8, cleaning pads 105 made of suitable soft, nonabrasive material are affixed to the inner surface of belt 46 between successive belt slots 46a. Pads 105 are aligned with fiber optics 58 and 103 and extend slightly beyond belt slot tabs 46b so as to contact and wipe clean the output ends of the fiber optics once during each revolution of conveyor belt 46.

Length Inspection Circuitry

The electrical signals generated by photo diodes 35, 36 and 37 in response to a capsule 20 passing through length inspection station 30 are translated into a solenoid-valve-actuating signal by the circuitry indicated in block diagram form in FIG. 1. Photo diodes 35, 36, 37 all produce signals of substantially the same wave shape for a particular capsule since each of the respective infra-red beams impinging thereon is affected in the same manner by the particular capsule. The leading and trailing edges of the signal from each photo diode represent the passage of the leading and trailing edges of a capsule past the beam received by each diode. The significant difference in the signals from the three photo diodes is the time at which they begin and terminate.

Photo diodes 35, 36, 37 are respectively connected by conductors 110, 112 and 114 to conventional transistorized amplifier stages 116, 118 and 120 which preferably have rapid rise and decay characteristics to minimize distortion in the most significant portions of the capsule modulated signal. The amplified signals from amplifiers 116, 118, 120 are fed respectively via conductors 122, 124, and 126 to trigger stages 128, 130, and 132 of the known Schmitt type. These Schmitt trigger stages are bi-stable or two-state devices which produce a square wave output signal of the same duration as the input signal thereto. Preferably Schmitt trigger 128 generates a square wave signal which, for example, rapidly goes from zero reference potential to negative 15 volts when it is turned "on" by the leading edge of the input signal thereto. Trigger 128 then produces a steady direct current output potential at the minus 15 volt level until the trailing edge of the input signal switches the trigger to the "off" condition, whereupon the output level of the signal rapidly returns from minus 15 volts to zero potential. Schmitt triggers 130 and 132 are actuated in the same manner and generate square wave signals which, for the above output signal of trigger 128, have a direct current potential of minus 15 and plus 5 volts respectively in the "off" condition thereof, while in the "on" condition thereof they respectively generate a direct current signal of plus 5 and minus 15 volts.

These output signals from triggers 128, 130, and 132 are fed by conductors 134, 136, and 138 to a gate 140. Gate 140 includes conventional diodes which are suitably connected to develop an input signal for an amplifier stage 142 whenever the combined output of Schmitt triggers 128, 130, 132 indicate that an underlength or overlength capsule is passing through length inspection station 30. A capsule which is too short causes gate 140 to pass an input signal due to the output signal from trigger 128 returning to the "off" condition prior to trigger 130 switching to its "on" condition. An input signal is also passed when an overlength capsule causes the output signal from trigger 128 to continue in the "on" condition thereof until after the output signal from trigger 132 is triggered from the "off" to "on" condition.

Amplifier stage 142 amplifies the triggering signal passed by gate 140, and the output of amplifier 142 is connected via a conductor 144 to a pulse generator 146. Pulse generator 146 is preferably a well known single-shot multivibrator comprising two inverting transistor amplifiers statically coupled in one direction and capacitively coupled in the other so that a trigger pair is formed which is stable in only one state. The amplified triggering signal sets pulse generator 146 into the unstable condition where it remains for the period of the time determined by its RC network after which it flips back to the stable state, here its "off" condition. The magnitude and duration of the output signal of pulse generator 146 is set to actuate solenoid 39a which opens an air valve 39b interposed in compressed air line 40, thereby causing a blast of compressed air to eject an improper length capsule into the reject hopper 44. The foregoing translation from capsule length inspection to improper length capsule rejection requires time in both the electrical circuitry and in the mechanical rejection mechanism. This time is measured and multiplied by the velocity of capsule 20b falling through length inspection station 30 to arrive at the correct spacing between the length inspection station and reject station 38.

Spin Inspection Circuitry

The defect inspection circuitry associated with one channel of the spin scanning station of the inspection machine is shown in block diagram form in FIGS. 1A and 17 along with graphs illustrating the wave shapes occurring at selected points in this circuitry. The output electrodes of semi-conductor photo diode 59 are connected via a conductor 160 to a pre-amplifier stage 162. Pre-amplifier 162 is of conventional transistorized construction and functions to amplify the composite signal developed by linear movement of the solid portions of belt 46, by the leading and trailing edges of belt slot 46a and by the empty capsule assembly 20 spinning therein. The output wave shape of the electrical signal developed by pre-amplifier 162 is indicated therebelow on a voltage-time graph for both a good capsule and a defective capsule. When the beam of infra-red radiation is completely blocked by the solid portion of belt 46 between slots 46a, the electrical potential of the output signal is at a D.C. level indicated 164 in FIG. 17. When the forward edge of a slot 46a passes into the beam of infra-red radiation, the potential of the photo diode output signal drops to a no-obstruction D.C. level 165 proportional to maximum beam intensity and then rises to some D.C. value shown at 166 which is proportional to the amount of infra-red radiation transmitted through the body tube of the empty capsule. The wave shapes are based on the assumption that the good and bad capsules are being transported with the inner body tube leading the outer cap tube, and with the rearward end of the cap tube riding against the rearward belt slot tab 46b. Capsules may also be transported in a position reversed from the illustrative position, in which case the signal levels representative of the body and cap tubes are also reversed from that shown in the voltage-time graphs.

Imperfections in the empty capsules such as bubbles, holes and scratch marks in the walls of the capsules, striations and scraper marks imparted by the manufacturing machinery to the surfaces of the capsule, and foreign objects such as dirt, specks or dark inclusions in the wall itself, have been found to occur, with respect to the longitudinal center axis of the capsule, as circumferential variations in the infra-red conductivity of the capsule. Thus when a capsule is rotated, these circumferentially non-continuous defects cause a variation in the intensity of the infra-red beam emitted from the capsule each time the capsule is revolved. Due to the high spin speed of the capsule (approximately 14,000 r.p.m.) these defects cause correspondingly high frequency amplitude variations in the relatively steady signal level 166 which in turn represents infra-red radiation absorbed by the opposite sides of the body tube of the capsule as it moves axially through the beam with a relatively slow forward speed (approximately five inches per second). When the beam strikes the point in the capsule assembly where the cap tube begins, it passes through four walls instead of two. This circumferentially continuous axial variation in the infra-red conductivity of the capsule assembly is reflected at a low frequency established by the axial transport speed of the capsule and, as seen in the wave shape graph, causes a change in the potential level between signal portion 166 and a signal portion 168. In other words, this large, low frequency potential shift represents the beginning of the signal generated by the beam as it axially scans the portion of the rotating capsule assembly where the cap and body tubes overlap. As the capsule moves on past the beam of infra-red radiation the trailing edge of slot 46a blocks off the beam and the signal therefore returns to the potential level 164.

It is to be understood that the particular capsules under consideration average about one half inch in axial length and about one quarter inch in diameter. It has been found possible to detect those defects, such as a bubble 21 (FIG. 14), having a relatively short axial dimension on the order of thousandths of an inch. This is achieved by utilizing a photo diode having an input aperture which admits a scanning beam of relatively small diameter, preferably on the order of one sixteenth of an inch or less. With this small diameter scanning beam a high signal-to-noise ratio is obtained, thereby increasing the sensitivity of the spin inspection mechanism for detecting very small defects. To insure that such small defects are not missed by the small diameter scanning beam, the capsule transport-to-spin speed ratio is adjusted so that the average diameter capsule is rotated approximately three times as it advances axially by a distance equal to the dimension of the scanning beam taken in the direction of axial capsule movement. Thus the leading edge of a defect such as bubble 21, regardless of the axial dimension of the defect and its angular position with respect to the scanning beam, is certain to intersect the beam at least three times at its point of intersection with the beam closest to the photo diode. Hence, such defects each cause three high frequency amplitude variations as they travel through the beam. At least one of these amplitude variations exceeds that established as representative of a minimum significant defect. In the foregoing manner, a bad capsule containing three axially short defects produces a signal having three high amplitude, high frequency signals 170, 171 and 172 as illustrated in exaggerated form in the bad capsule voltage-time graph associated with the output of preamplifier 162.

In order to translate this indication of a defective capsule into a capsule rejection signal, the composite signal produced by preamplifier 162 is fed via conductor 173 to a conventional high pass filter stage 174 consisting of a single LC section. Due to the wide differential in the spin and transport speeds of the capsule, the filter may have a wide pass characteristic for the high frequency defect-indicating portions of the signal and still reliably filter out the low frequency variations characteristic of the belt slot edges, of the closed ends of the capsule tubes, and of the edges of the open ends of the capsule tubes.

The filtered high frequency signal is fed via a conductor 176 to a conventional transistorized amplifier stage 178 the output of which is a signal as shown in the wave shape diagrams of FIG. 17 associated with the output of amplifier 178. A good capsule produces a signal wherein the amplitude of the high frequency variations does not exceed a predetermined potential level 180 indicative of a defect, while the particular bad capsule under consideration generates a signal having at least one amplitude peak for each defect indicating signal 170a, 171a, 172a which exceeds the predetermined potential level 180. These high potential signals are fed via a conductor 184 to the input of a transistor comparator stage 186. Comparator 186 is suitably biased to produce an output signal when the input thereto from amplifier 178 exceeds the predetermined amplitude level 180 indicative of a minimum significant defect. The wave shape diagram associated with the output of comparator 186 illustrates the difference in output signals thereof between a good and bad capsule, the output signal for the bad capsule having three defect-indicating pulses 170c, 171c and 172c corresponding to the defect-indicating signals 170a, 171a, 172a.

In order for the infra-red beam to scan the entire length of a capsule as it is spun past the beam in the defect inspection station, a defective capsule must be rejected at some time after and not simultaneously with the detection of a defect therein. To accomplish this delayed rejection, a circuit 190 known as a shift register is provided to which triggering signals from comparator 186 are conducted via a conductor 189. Shift register 190 functions to delay these signals in time, the signal delay being correlated with the movement of a defective capsule from the spin station to the reject station. It has been found convenient to space reject station 80 from the spin station by a distance of three belt slots 46a. Thus while a defective capsule is being transported this distance beyond the inspection beam cast by fiber optic 58, shift register 190 is storing a signal which is used to actuate the solenoid of rejection valve mechanism 85.

Shift register 190 contains three flip-flop stages 192, 194, and 196 of conventional design and each utilizing two transistors which are connected as a bi-stable trigger pair to operate as two inverting amplifiers statically coupled to each other. The trigger signals 170c, 171c, 172c representing the three defects in the bad capsules are fed from comparator 186 via conductor 189 into the first flip-flop stage 192. Any one of these trigger signals is capable of setting flip-flop 192, but once flip-flop 192 is set by the first signal 170c, the subsequent signals 171c and 172c do not affect the state of the flip-flop.

The reset inputs to the three flip-flops 192, 194 and 196 are each controlled by reset pulses which are generated by the timing photo diode 102 and fed via conductor 198 to the respective reset inputs of the flip-flops. Timing diode 102 is positioned a predetermined distance from the inspection beam cast by fiber optic 58 so that the leading edge of an empty slot 46a passes through the infra-red beam cast between fiber optic 103 and timing diode 102 just after the slot 46a containing the defective capsule has finished passing through the inspection beam. Hence the timing signal arrives at the reset input of flip-flop 192 after all defect-indicating signals from a capsule being inspected, such as signals 170c, 171c, 172c, have arrived at the input of flip-flop 192. It is also to be noted that this relative positioning of timing diode 102 and inspecting diode 59 with respect to the belt slots insures that triggering pulses are not applied to the set input of flip-flop 192 at the same time that timing pulses are being applied to the reset input of flip-flop 192.

In operation of shift register 190, the aforesaid defective capsule undergoing spin scanning inspection causes the first trigger signal 170c to be generated which then turns flip-flop 192 to its "on" condition. The timing pulses generated by empty belt slots passing successively through the infra-red timing beam then successively shift this condition or information from flip-flop 192 to flip-flop 194, to flip-flop 196, and thence to a pulse generator 200.

Pulse generator 200 preferably is a transistorized single-shot multi-vibrator which is set by the timing pulse when this pulse is gated to the input of generator 200 by the output of flip-flop 196. The output signal from pulse generator 200 thus occurs when the defective capsule has moved slightly more than three spaces away from the inspection station and is positioned over the row of air tubes 84. The output signal from pulse generator 200 is conducted via conductor 202 to the solenoid-actuated valve mechanism 85, causing it to open compressed air line 86 so that the defective capsule is ejected by the air jets issuing from air tubes 84.

It will now be appreciated that the simultaneous spinning and transporting of a capsule as it is inspected makes possible the use of a relatively simple electrical system wherein undesired signals generated by the track and by the ends of the cap and tube bodies of the capsule assembly are easily eliminated by a single conventional filter section. The high spin-to-transport speed ratio also permits the use of a scanning beam of relatively small cross sectional area for maximum sensitivity by causing several revolutions of the capsule as each axial increment thereof equal to the axial beam width passes through the beam. These features together cooperate to provide rapid, uninterrupted and reliable inspection of capsules.

*Malfunction Detection System*

Referring to FIGS. 1 and 1A, the capsule inspection machine of the invention is provided with a malfunction detection system which senses the occurrence of a stoppage or outage in any of the significant operating components of the machine. When this happens certain electrically powered components of the machine are shut off by a relay switch 210 which opens power leads 218 and 220 connected through a power control box 212 to a power supply 213 which in turn is connected to a suitable source of alternating current power supply. Power leads 214, 216, 218 and 220 are respectively connected to spin motor $E_3$, vacuum pump motor E, the drive motor for vibratory feeder mechanism 24, and the transport and delivery conveyor motor $E_1$.

The malfunction detection components are electrically energized where necessary by a power supply 222 connected via power control 212 and independently of relay 210 to the source of A.C. power. Power supply 222 is connected with a conventional "OR" gate 224 which operates to produce an output signal for actuating relay 210 upon receiving an input signal from any one of the malfunction detection devices. The first detecting device in the order of capsule travel through the machine is a light-off detector 226 (FIG. 1) which includes a suitable photocell for generating a malfunction signal which is fed by a conductor 228 to gate 224 if and when the infra-red generating lamp of light source 34 fails to provide an output above a predetermined intensity.

Referring to FIG. 1A, an air pressure detector 234 is provided which includes a pressure switch for generating a malfunction signal which is fed via conductor 236 to gate 224 whenever the positive air pressure in compressed air line 40 supplying length and defect rejection stations 38 and 80 falls below a predetermined positive pressure level. It is to be noted that air line 40 is connected to the exhaust pipe of vacuum pump V so that the pump provides the supply of compressed air as well as vacuum for the inspection machine. Hence air pressure detector 234 also senses the occurrence of a failure in the vacuum system.

Referring to FIGS. 11, 12 and 1A, malfunction of spin rollers 60a, 60b, 60c, 60d is detected by four magnetic pickups 238 which are mounted in pairs in each of the cradle frames 61 in a vertical position with the upper ends thereof closely adjacent the undersurfaces of outermost spin rollers 60a and 60d. Two small holes 240 are drilled 180 degrees apart in each of spin rollers 60a and 60d in an axial position opposite magnetic pickups 238. Rotation of the spin roller causes each of the radial holes 240 to rotate past magnetic pickup 238 twice during each revolution of the spin roller, thereby causing variations in the magnetic flux density in pickup 238 which occur at double the frequency of spin roller speed. Magnetic pickup 238 includes a coil winding which is balanced for the electrical signal generated in pickup 238 when the spin rollers are rotating within a given speed range, such as from 7000 r.p.m. and above. A malfunction signal is generated by the coil becoming unbalanced whenever the frequency of the input signal falls below a predetermined level corresponding to the minimum desired spin roller speed. This malfunction signal is fed via a conductor 242 to an amplifier 244 which provides an amplified malfunction signal fed via conductor 246 to gate 224. Due to the particular driving mechanism for the spin rollers wherein the center short roller 61c drives the middle spin rollers 60b and 60c and these in turn via short rollers 61b and 61d drive outermost spin rollers 60a and 60d, it is only necessary to detect malfunction of two of the four spin rollers. If the outermost spin rollers are functioning properly, the middle rollers must likewise be functioning properly.

In order to sense stoppage of transport conveyor belt 46, a stopped track detector 248 is connected via a lead 250 to the output from timing photo diode 102. Detector 248 thus receives a signal having a frequency determined by the number of empty slots 46a per second passing timing diode 102, and if and when this signal falls below a predetermined frequency level detector 248 operates to generate a malfunction signal which is fed via lead 252 to gate 224.

Malfunctioning of the length and defect inspection circuitry is detected by a periodic scanning system which determines whether or not the inspection machine is finding eough defective capsules in accordance with predetermined statistical estimates of the quality of the run of capsules being inspected. This detection system includes a reject storage memory 260 connected via a lead 262 to the output lead 147 of length reject pulse generator 146. Reject storage memory 260 is also connected by another lead 264 to the output lead 202 of flaw reject pulse generator 200. Whenever an improper length capsule in a given channel causes a length rejection signal to be generated, or whenever a capsule containing flaws causes the circuitry associated with spin scanning diode 59 to generate a rejection signal, a relay connected to the pulse generator for such channel is actuated in reject storage memory 260. At the end of a statistically predetermined time interval, such as fifteen minutes, a timing mechanism in a scanner 266 connects all the relays in reject storage memory 260 with "OR" gate 224 via lead 268. These relays are bi-stable switches which upon being set remain in this condition until reset by connection with the fifteen minute scanner 266. If any of the relays have been opened during the fifteen minute period by the occurrence of a reject, an open circuit condition exists from scanner 266 to gate 224. However, if no rejects have occurred within this time interval the relays form a completed circuit, thereby passing a malfunction signal generated by scanner 266 to gate 224 so as to shut down the machine.

It is to be understood that, as in the case of the periodic scanner 266, where the operating components of the machine are duplicated for each of the six channels of the machine, the malfunction detection devices associated with these components are repeated as necessary for each channel.

Metering and Control Panel

Referring to FIG. 18, a control panel 280 is shown which may be mounted directly on cabinet C of the machine, as illustrated in FIG. 2, or which may be located remote from the machine on a master board for centralized control of a bank of inspection machines. Control panel 280 includes an on-off toggle switch 282 for main power control as well as an on-off pushbutton switch 284 for vacuum pump motor E. A calibration control 286 and a calibration ammeter 288 are provided for respectively adjusting and indicating the gain of pre-amplifier stage 162 of the spin inspection circuit. The remainder of control panel 280 contains malfunction indicators and capsule counters.

As indicated schematically in FIG. 1A, each malfunction detecting device in addition to providing a malfunction input signal to "OR" gate 224 also turns on a malfunction indicator light located on control panel 280. For example, if one of the spin rollers should stop rotating during operation of the machine, the malfunction signal from magnetic pickup amplifier 244 causes gate 224 to shut down the conveyor belt and vibratory feeder and simultaneously via lead 292 energizes a spin malfunction indicator light 290. In like manner, lights 293, 294, 295 and 296 respectively indicate malfunctions of the vacuum system, compressed air system, conveyor belt 46, and light source 34. The scanner 266 of the periodic scanning system is also connected so that a malfunction signal caused by a "no reject" condition occurring in the length or spin inspection tsations respectively lights indicator lamps 306 and 308 provided for each of the six channels.

The capsule inspection machine also keeps track of the total number of capsules inspected, the number of capsules rejected because of improper length, and the number of capsules rejected because of defects detected in the spin station. In order to accomplish this, output lead 134 from Schmidt trigger 128 in the length inspection circuitry is connected to a pulse generator 298 (FIG. 1), preferably a single-shot multi-vibrator, which actuates a total count mechanism 300. Pulse generator 298 receives a signal every time a capsule passes through length inspection station 30, the count for each channel being indicated in a separate totalizer 300 mounted in an upper row on control panel 280 (FIG. 18). In order to count the number of capsules rejected for being of improper length, a length reject counter 302 is provided for each channel which is connected to the output lead 147 of pulse generator 146 of the length inspection circuitry so that the rejection mechanism actuating signal therefrom also serves to actuate length reject counter 302 (middle row on control panel 280). Similarly, a flaw reject counter 304 (FIG. 1A) is connected to the output of pulse generator 200 of the spin inspection circuitry so that it is actuated every time a capsule is rejected as a result of defects detected in the spin station.

The above described capsule inspection machine provides good quality control characteristics due to the provision of the counters which give an immediate indication of the total number of defective capsules versus the total number of capsules inspected. In addition, the method of the invention wherein defective capsules are segregated into those of improper length and those having flaws detected by spin inspection, with a separate count of each type, cooperates with the malfunction detecting and indicating equipment to give a quick approximate indication of where the defect-causing trouble is occurring in the capsule production process.

We claim:

1. A method for loading objects onto a continuously moving conveyor belt having openings therein shaped to receive the objects comprising the steps of feeding the objects one at a time into the upper end of an inclined chute the lower end of which is positioned slightly above the moving conveyor belt, allowing the objects to slide freely down said chute under the influence of gravity while guiding the objects in a position oriented to generally correspond with the orientation of said openings in said moving conveyor belt, correlating the rate of feed of the objects to the chute, the incline of the chute and the speed of the belt so that said openings in the belt travel past the lower end of the chute in the direction of the horizontal component of velocity of the objects sliding down the chute and at a rate greater than the feed of objects to the chute and assisting each object as it leaves the lower end of the chute to locate and become seated in one of said openings by maintaining a current of fluid for drawing the objects to said openings.

2. A method for loading capsules onto the top run of a continuously rotating conveyor belt having openings therethrough shaped to receive the capsules comprising the steps of feeding capsules one at a time to the upper end of an inclined chute the lower end of which is positioned slightly above the upper run of the conveyor belt, allowing the capsules to slide freely down said chute under the influence of gravity to thereby develop a component of velocity in the direction of travel of the upper run of said belt, correlating the linear speed of the belt with the rate of feeding capsules to the chute and the incline of the chute so that at least two of said openings in the belt travel past the lower end of the chute for each capsule descending therein and assisting the capsules discharged from the lower end of the chute to locate and become seated in the openings in the belt by inducing a flow of air downwardly through said openings.

3. The method called for in claim 2 wherein said flow of air is induced by creating a sub-atmospheric air pressure on the underside of said run of the belt whereby the capsules discharged from the lower end of the inclined chute are drawn into said openings and held therein by the streams of air flowing downwardly therethrough and are retained in said opening by the air pressure differential between the top and the underside of said run of said belt.

4. Apparatus for transporting capsules from an upper to a lower level and horizontally at the lower level comprising, an endless conveyor belt having a generally horizontally extending upper run at said lower level and having openings therein shaped to receive and transport the capsules, an inclined chute extending between said levels with the lower end thereof positioned slightly above the upper run of said conveyor belt, said chute being shaped to receive and guide said capsules for sliding movement in a position oriented to correspond with the orientation of said openings in said belt, means for feeding said capsules one at a time at a predetermined rate into said chute at said upper level whereby said capsules slide freely down said chute under the influence of gravity to thereby develop a component of velocity in the direction of travel of the upper run of said conveyor belt, means for driving said conveyor belt at a speed so that said openings therein travel past the bottom end of said chute at a rate faster than the predetermined rate of feed of the capsules into said chute and means for generating a current of fluid for drawing each capsule as it leaves the end of the chute to one of said openings.

5. Apparatus for conveying capsules including in combination an endless conveyor belt having a generally horizontally extending top run, said belt having a row of longitudinally spaced openings therein each of a size to receive one of the capsules, means for driving the conveyor belt, support means fixedly mounted on the underside of the top run of the belt and aligned with said openings for supporting the capsules in said openings, said support means having an aperture therein communicating with said openings throughout the travel thereof over said support means, means defining a vacuum chamber on the underside of the top run of said belt and having an inlet adjacent said support means and means for establishing a sub-atmospheric pressure in said vacuum chamber to induce a flow of air downwardly through said openings and said aperture of said support means whereby said capsules are transported by being individually drawn into said belt openings and slidably held on said support means by said air streams while they are conveyed horizontally on the support means by said belt.

6. The combination as set forth in claim 5 wherein said support means comprises a track having a longitudinally extending groove therein positioned directly beneath said row of openings in the belt, said groove establishing communication between the openings in the belt and the space beneath the track throughout the length of the track.

7. The combination as set forth in claim 5 wherein each of said openings is slightly larger than the capsules.

8. Apparatus for conveying capsules including in combination an endless conveyor belt having a generally horizontally extending top run, said belt having a row of longitudinally spaced openings therein each being at least as large as the capsules to receive one of the capsules, means for driving the conveyor belt, support means fixedly mounted on the underside of the top run of the belt and aligned with said openings for supporting the capsules in said openings, said conveyor belt having means affixed to the trailing edge of each opening and projecting downwardly therefrom for propelling the capsules along said support means, said support means being apertured and the aperture therein communicating with said openings, means defining a vacuum chamber on the underside of the top run of said belt and having an inlet adjacent said support means and means for establishing a sub-atmospheric pressure in said vacuum chamber to induce a flow of air downwardly through said openings and said support means whereby said capsules are transported by being individually drawn into said belt openings and slidably held on said support means by said air streams while they are conveyed horizontally on the support means by said belt.

9. The combination as set forth in claim 8 wherein said support means comprises a track having a V-shaped groove therein which establishes communication between the openings in the belt and the underside of the track and which accommodates the downwardly projecting propelling means at the trailing edges of the openings.

10. The combination as set forth in claim 8 wherein said conveyor belt comprises a one-piece metal belt having high flexibility and tensile strength, and wherein said downwardly projecting means comprise tabs integral with the belt and bent downwardly at right angles to the surface of said belt at the trailing edges of said openings therein.

11. A mechanism for loading articles into the upper run of an endless conveyor belt which travels in a generally horizontal plane and which has a row of longitudinally spaced openings therein shaped to individually receive the articles, said mechanism comprising a delivery chute inclined relative to the plane of the upper run of said belt and having the lower end thereof positioned closely above but out of contact with the upper run of said belt, said inclined chute having a longitudinally extending groove therein to receive and guide the articles with their longitudinal axes aligned in the direction of descent thereof in the groove, said groove in turn being aligned with the longitudinal axis of said openings in said belt so that articles descending in said groove are properly oriented for acceptance in said openings of said belt, a vacuum chamber positioned beneath said upper run of said belt for maintaining an air stream downwardly through said belt openings, and a housing overlying the lower end of said chute and the upper run of said belt for a given distance in the direction of movement thereof away from the bottom end of said chute for confining articles descending therefrom on the upper run of said belt, said housing also providing an extension of said vacuum chamber whereby an air stream is formed in said groove of said chute at the point where said groove enters said housing so that an object descending in said groove as it enters said housing is swept by said air stream into an opening in said belt.

12. The combination as set forth in claim 11 which further includes a flexible baffle dependently supported within said housing with the bottom free end thereof positioned closely adjacent a row of said openings in said belt, said baffle being spaced from the bottom end of said chute and in the direction of travel of said belt to serve as a backstop for capsules which rebound from the solid portions of said belt after descending from said chute and for holding capsules fixed relative to the movement of said belt until said capsules enter said openings and hence are free to pass under said baffle.

13. The combination as set forth in claim 11 including a kickback roller supported within said housing at a position remote from said inclined chute for rotation about an axis at right angles to the direction of travel of said openings and with the lower circumferential surface of said roller being spaced a predetermined distance above the upper surface of said belt, said roller being continuously rotated so that said lower circumferential surface thereof moves in a direction opposite to that of said belt whereby capsules which are improperly seated in said openings of said belt so as to extend beyond said predetermined distance above the surface of said belt are engaged by said roller as said capsules attempt to pass thereunder and are dislodged from said openings and thrown back toward said chute so as to have a chance to enter and properly seat in another opening in said belt.

14. In combination, an endless conveyor belt having a longitudinal row of openings therein shaped to receive objects therein, support means on the underside of the upper run of said conveyor belt for supporting said objects within said belt openings, said support means being apertured for passing air from one side of said belt to the other via said openings, means for drawing air through said openings and thence through said apertured support means so as to air clamp said objects in said openings, inspection means positioned along said upper run of said conveyor belt for detecting defects in the objects being propelled on said support means by said conveyor belt, ejection means spaced from said inspection means along said upper run of said belt in the direction of travel thereof and having air passage means connected with a source of compressed air and communicating via said apertured support means with said longitudinal row of openings in said belt independently of said air drawing means, said ejection means being connected to said inspection means for delayed actuation thereby in response to detection of a defective object whereupon compressed air is directed via said air passage means in a direction opposite to the flow of the drawn air and into the belt opening travelling thereover to eject the defective object upwardly into a receiving structure.

15. The combination called for in claim 14 wherein said air passage means comprise a plurality of relatively small air passages arranged in a longitudinal row with the outlet ends thereof communicating with said longitudinal row of openings in said belt, a solenoid-actuated valve mechanism for controlling the flow of compressed air to said air passages, said valve mechanism being connected to said inspection means for delayed actuation thereby in response to detection of a defective object whereby opening of said valve mechanism causes air jets to be formed by said air passages which eject the defective object from the belt opening travelling thereover upwardly into said receiving structure with a relatively high velocity for a relatively low volume of air.

16. A mechanism for simultaneously transporting and spinning cylindrical objects including in combination an endless conveyor belt rotatably supported at the ends thereof, said conveyor belt having an opening therein shaped to receive said cylindrical object therein with the axis of said cylindrical object being aligned parallel with the direction of travel of said belt, a pair of spin rollers rotatably supported side by side adjacent one surface of one run of said belt with the rotational axes thereof parallel to the direction of travel of said belt, said spin rollers being spaced apart so that the adjacent circumferential surfaces thereof support said object when received in said belt opening with a portion of said object projecting into said belt opening so that said belt engages and axially propels said object slidably on and between said spin rollers, and means for rotating said rollers in the same angular direction so that said object is rotated by frictional contact with the circumferential surfaces of said rollers while simultaneously being axially propelled along said rollers by said belt.

17. The combination as set forth in claim 16 including vacuum supply means positioned to draw a continuous air stream from the surface of said belt opposite from said spin rollers through said belt opening and then through the space between said spin rollers for holding said object in sliding engagement with said spin rollers.

18. In a capsule inspection machine, means for rotating the capsules while they are being inspected comprising support means having first, second and third support rollers journalled thereon in spaced apart positions with their axes parallel to one another, first and second capsule spinning rollers resting in side-by-side relation respectively on said first and second and said second and third support rollers, said capsule spinning rollers being formed of a magnetic material, magnetic means mounted beneath said capsule spinning rollers providing a magnetic holddown force cumulative to the weight of said spinning rollers for maintaining said capsule spinning rollers in operative position on said support rollers, and driving means for rotating said support rollers for imparting rotation to said spinning rollers.

19. The combination as set forth in claim 18 wherein said driving means comprises an electric motor having a frictional driving wheel affixed to the drive shaft thereof for contact with one of said support rollers, said motor being pivotally supported so that the weight of said motor acts to urge said driving wheel into driving contact with said one support roller to provide a frictional drive which slips in the event of said capsule spinning rollers becoming jammed in operation.

20. The combination as set forth in claim 18 wherein each of said capsule spinning rollers has a conical recess formed in the opposite ends thereof concentric with the rotational axes thereof, and which further includes a retaining pin for each recess slidably mounted in said support means co-axial with said capsule spinning rollers at each end thereof, and spring means for urging each of said retaining pins into said conical recesses for yieldably limiting endwise movement and lateral shifting of the capsule spinning rollers.

21. In combination, an endless conveyor belt having a longitudinal row of openings therein shaped to receive objects therethrough, support means comprising track means having a groove therein positioned beneath the upper run of said conveyor belt for slidably supporting said objects thereon and within said belt openings, said support means being apertured for passing air from one side of said belt to the other via said openings, inspection means positioned along the upper run of said conveyor belt for detecting defects in the objects being propelled on said support means by said conveyor belt, ejection means spaced from said inspection means along said upper run of said belt in the direction of travel thereof and having air passage means connected with a source of compressed air and communicating via said apertured support means with said longitudinal row of openings in said belt, said ejection means being connected to said inspection means for delayed actuation thereby in response to detection of a defective object whereupon compressed air is directed via said air passage means into the belt opening traveling thereover to eject the defective object upwardly into a receiving structure, object delivery means positioned intermediate the upper and lower runs of said conveyor belt and spaced from said ejection means in the direction of conveyor belt travel beyond the downstream end of said track means and an air nozzle structure positioned above the upper run of said belt opposite said delivery means for directing a continuous stream of air downwardly on said conveyor belt openings passing thereover, whereby objects propelled beyond the end of said track means by said conveyor belt are both blown and dropped downwardly into said delivery means.

References Cited in the file of this patent
UNITED STATES PATENTS

| | | |
|---|---|---|
| 731,722 | Turner et al. | June 23, 1903 |
| 1,582,820 | Hungerford | Apr. 27, 1926 |
| 1,618,660 | Howard | Feb. 22, 1927 |
| 1,921,863 | Bickley | Aug. 8, 1933 |
| 2,595,762 | Caldwell | May 6, 1952 |
| 2,732,987 | Moore | Jan. 31, 1956 |
| 2,849,980 | Collins | Sept. 2, 1958 |
| 2,859,689 | Ackley | Nov. 11, 1958 |
| 2,887,622 | Rayburn | May 19, 1959 |
| 2,951,364 | Sherrill | Sept. 6, 1960 |